US012779371B2

(12) United States Patent
Glover et al.

(10) Patent No.: US 12,779,371 B2
(45) **Date of Patent: *Nov. 3, 2026**

(54) STRUCTURED ELEMENTS AND METHODS OF USE

(71) Applicant: CRYSTAPHASE PRODUCTS, INC., Houston, TX (US)

(72) Inventors: John Glover, Houston, TX (US); Austin Schneider, Humble, TX (US); Peter Ham, Houston, TX (US)

(73) Assignee: CRYSTAPHASE PRODUCTS, INC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/995,597

(22) Filed: Aug. 17, 2020

(65) Prior Publication Data

US 2020/0376413 A1 Dec. 3, 2020

Related U.S. Application Data

(63) Continuation of application No. 15/393,573, filed on Dec. 29, 2016, now Pat. No. 10,744,426.

(Continued)

(51) Int. Cl.

*B01D 21/00* (2006.01)
*B01D 3/00* (2006.01)
*B01J 19/30* (2006.01)

(52) U.S. Cl.

CPC ......... *B01D 21/0087* (2013.01); *B01D 3/008* (2013.01); *B01D 21/0012* (2013.01);

(Continued)

(58) Field of Classification Search

None

See application file for complete search history.

(56) References Cited

U.S. PATENT DOCUMENTS

| | | | | |
|---|---|---|---|---|
| 436,414 A | | 9/1890 | Graham | |
| 475,961 A | * | 5/1892 | Hoff et al. | B01J 19/30<br>261/95 |

(Continued)

FOREIGN PATENT DOCUMENTS

| | | |
|---|---|---|
| AU | 2004232690 | 11/2004 |
| AU | 2010203014 | 8/2010 |

(Continued)

OTHER PUBLICATIONS

Japanese Patent Office; Office Action, issued in connection to application No. 2019-140168; Sep. 2, 2020; 9 pages; Japan.

(Continued)

*Primary Examiner* — Robert J Popovics

(74) *Attorney, Agent, or Firm* — Greenberg Traurig LLP

(57) ABSTRACT

Structured elements with capabilities for stream flow division and distribution and mitigation of undesired species that exceed those of conventionally available materials are provided. The structured elements provide increased opportunities for surface attraction, retention and coalescence of undesired species in a process stream. The functional contact surfaces of the structured elements can include one or more of the faces of cells, the surfaces of struts connecting cells, the surfaces of nodes connecting struts, and the surfaces of asperities or irregularities caused by channels, flutes, spikes, fibrils or filaments in or on the material surfaces.

3 Claims, 7 Drawing Sheets

Related U.S. Application Data

(60) Provisional application No. 62/294,718, filed on Feb. 12, 2016, provisional application No. 62/273,590, filed on Dec. 31, 2015.

(52) U.S. Cl.
CPC ............ *B01J 19/30* (2013.01); *B01J 2219/30* (2013.01); *B01J 2219/30207* (2013.01); *B01J 2219/30238* (2013.01); *B01J 2219/30246* (2013.01); *B01J 2219/30269* (2013.01); *B01J 2219/30416* (2013.01); *B01J 2219/30475* (2013.01); *B01J 2219/30483* (2013.01); *B01J 2219/30491* (2013.01)

(56) References Cited

U.S. PATENT DOCUMENTS

| | | | | | | |
|---|---|---|---|---|---|---|
| 556,040 | A | * | 3/1896 | Alberger | B01J 19/30 | 159/13.4 |
| 578,548 | A | | 3/1897 | Deruelle | | |
| 598,351 | A | | 2/1898 | Staub | | |
| 912,310 | A | * | 2/1909 | Guttmann | B01J 19/30 | 261/95 |
| 1,173,187 | A | * | 2/1916 | Hechenbleikner | B01J 19/30 | 261/95 |
| 1,185,541 | A | * | 5/1916 | Rich | B01J 19/30 | 428/534 |
| 1,293,270 | A | * | 2/1919 | Webb | B01J 19/30 | 261/95 |
| 1,307,635 | A | * | 6/1919 | Nielsen | B01J 19/30 | 261/95 |
| 1,360,928 | A | * | 11/1920 | Camillo | B01J 19/30 | 261/95 |
| 1,365,671 | A | * | 1/1921 | Fairlie | B01J 19/30 | 261/95 |
| 1,480,463 | A | * | 1/1924 | Petzel | B01J 19/30 | 261/95 |
| 1,503,208 | A | * | 7/1924 | Prym | B01J 19/30 | 261/95 |
| 1,654,925 | A | * | 1/1928 | Alexander | A62B 19/00 | 55/516 |
| 1,676,451 | A | * | 7/1928 | Lilge | F23M 20/00 | 261/95 |
| 1,725,429 | A | * | 8/1929 | Schaack, Jr. | B01J 19/30 | 261/95 |
| 1,796,501 | A | * | 3/1931 | Berl | B01J 19/30 | 261/DIG. 72 |
| 1,947,777 | A | | 2/1934 | Huff et al. | | |
| 2,000,078 | A | | 5/1935 | Haseltine | | |
| 2,006,078 | A | | 6/1935 | Pyzel | | |
| 2,037,317 | A | * | 4/1936 | Merrell | B01J 19/30 | 261/95 |
| 2,055,162 | A | | 9/1936 | Friedrich | | |
| 2,093,311 | A | * | 9/1937 | Craig | B01D 24/105 | 166/228 |
| 2,153,599 | A | | 4/1939 | Thomas | | |
| 2,172,714 | A | * | 9/1939 | Schack et al. | F28D 17/02 | 165/DIG. 21 |
| 2,183,657 | A | | 12/1939 | Page | | |
| 2,198,861 | A | | 4/1940 | Chamberlain | | |
| 2,212,932 | A | | 8/1940 | Fairlie | | |
| 2,375,336 | A | | 5/1945 | Weitkamp | | |
| 2,376,349 | A | * | 5/1945 | Frischer | B01J 19/30 | 422/310 |
| RE22,696 | E | * | 11/1945 | Frischer | B01J 19/30 | 261/DIG. 72 |
| 2,408,164 | A | | 9/1946 | Foster | | |
| 2,439,021 | A | | 4/1948 | Quigg | | |
| 2,546,479 | A | | 3/1951 | Sodano | | |
| 2,571,958 | A | | 10/1951 | Slaughter et al. | | |
| 2,591,497 | A | * | 4/1952 | Berl | B01J 19/30 | 261/95 |
| 2,602,651 | A | * | 7/1952 | Cannon | B01J 19/30 | 261/95 |
| 2,615,699 | A | * | 10/1952 | Olaf | B01J 19/32 | 261/95 |
| 2,639,130 | A | * | 5/1953 | Heere | B01J 19/305 | 261/97 |
| 2,639,909 | A | * | 5/1953 | Leva | B01J 19/30 | 261/95 |
| 2,739,118 | A | | 3/1956 | Comte | | |
| 2,793,017 | A | | 5/1957 | Lake | | |
| 2,819,887 | A | | 1/1958 | Eversole et al. | | |
| 2,821,006 | A | * | 1/1958 | Pfannmueller | B01J 19/30 | 264/339 |
| 2,834,466 | A | * | 5/1958 | Hament | C02F 1/645 | 261/95 |
| 2,867,425 | A | | 1/1959 | Teller | | |
| 2,893,852 | A | | 7/1959 | Montgomery | | |
| 2,919,981 | A | | 1/1960 | Calva | | |
| 2,921,776 | A | * | 1/1960 | William | B01J 19/30 | 261/DIG. 72 |
| 2,921,845 | A | * | 1/1960 | Nilsen | B01J 8/065 | 48/74 |
| 2,949,934 | A | * | 8/1960 | Hans | B01J 19/30 | 261/95 |
| 2,974,150 | A | * | 3/1961 | Mcclements | C07D 301/10 | 502/340 |
| 2,985,589 | A | | 5/1961 | Broughton et al. | | |
| 3,090,094 | A | | 5/1963 | Schwartzwalder et al. | | |
| 3,099,697 | A | * | 7/1963 | Lerman | B01J 19/30 | 261/97 |
| 3,100,688 | A | | 8/1963 | Dess | | |
| 3,151,187 | A | | 9/1964 | Comte | | |
| 3,159,910 | A | * | 12/1964 | Lehmer | B01J 19/30 | 165/4 |
| 3,167,600 | A | | 1/1965 | Worman | | |
| 3,169,839 | A | | 2/1965 | Calva | | |
| 3,170,969 | A | * | 2/1965 | Lerner | B01J 19/30 | 261/DIG. 72 |
| 3,171,820 | A | | 3/1965 | Volz | | |
| 3,175,918 | A | | 3/1965 | Mcgahan | | |
| 3,200,877 | A | * | 8/1965 | Lehmer et al. | B01J 19/30 | 261/95 |
| 3,208,833 | A | | 9/1965 | Carson | | |
| 3,214,247 | A | | 10/1965 | Broughton | | |
| 3,218,048 | A | * | 11/1965 | Smith, Jr. | B01J 19/30 | 261/DIG. 72 |
| 3,219,194 | A | | 11/1965 | Scwartzwalder | | |
| 3,232,589 | A | | 2/1966 | Eckert | | |
| 3,233,660 | A | * | 2/1966 | Nettel | F28D 19/02 | 261/95 |
| 3,266,787 | A | | 8/1966 | Eckert | | |
| 3,324,630 | A | * | 6/1967 | Teller | B01D 47/06 | 261/22 |
| 3,329,271 | A | | 7/1967 | Ward | | |
| 3,361,839 | A | | 1/1968 | Lester | | |
| 3,365,180 | A | * | 1/1968 | Lerner | F28F 25/08 | 261/DIG. 72 |
| 3,399,914 | A | * | 9/1968 | Kamet | E04B 1/1903 | 403/171 |
| 3,410,057 | A | | 11/1968 | Lerner | | |
| 3,423,185 | A | | 1/1969 | Ballard et al. | | |
| 3,430,934 | A | * | 3/1969 | Weishaupt | B01J 19/30 | 261/DIG. 72 |
| 3,431,082 | A | | 3/1969 | Sellin | | |
| 3,487,112 | A | | 12/1969 | Paulik et al. | | |
| 3,489,529 | A | | 1/1970 | Dudych et al. | | |
| 3,498,755 | A | | 3/1970 | Borre | | |
| 3,506,248 | A | | 4/1970 | Starbuck et al. | | |
| 3,543,937 | A | | 12/1970 | Choun | | |
| 3,544,457 | A | | 12/1970 | Fredrick et al. | | |
| 3,562,800 | A | | 2/1971 | Carlson | | |
| 3,563,887 | A | | 2/1971 | Sommers et al. | | |
| 3,567,192 | A | * | 3/1971 | Kerze | B01J 19/30 | 261/DIG. 72 |
| RE27,217 | E | * | 11/1971 | Eckert | F28F 25/04 | 261/DIG. 72 |
| 3,618,910 | A | | 11/1971 | Arndt | | |

(56) References Cited

U.S. PATENT DOCUMENTS 3,635,943 A 1/1972 Stewart
3,657,864 A 4/1972 Davis, Jr. et al.
3,685,971 A 8/1972 Carson
3,706,812 A 12/1972 Derosset et al.
3,717,670 A 2/1973 Schultz
3,732,078 A 5/1973 Kassarjian
3,752,453 A 8/1973 Doyne
3,758,087 A 9/1973 Hoon, Jr.
3,787,188 A 1/1974 Lyon
3,787,189 A 1/1974 Lovell et al.
3,789,989 A 2/1974 Carson
3,796,657 A 3/1974 Protorius et al.
D232,174 S * 7/1974 La Borde ..................... D23/209
D232,236 S 7/1974 La Borde
D232,237 S * 7/1974 La Borde ..................... D23/209
3,823,924 A 7/1974 Hoon, Jr.
3,844,936 A 10/1974 Newson
3,888,633 A 6/1975 Grosboll et al.
3,892,583 A 7/1975 Winter et al.
3,898,180 A 8/1975 Crooks et al.
3,914,351 A 10/1975 McKeown
3,924,807 A 12/1975 Morgan
3,947,347 A 3/1976 Mitchell
3,957,931 A * 5/1976 Ellis .......................... C02F 3/10 210/150
3,960,508 A 6/1976 Bessant et al.
3,962,078 A 6/1976 Hirs
3,966,644 A * 6/1976 Gustafson ................ B01J 19/30 502/220
3,992,282 A 11/1976 Grosboll et al.
4,005,985 A 2/1977 Hutson, Jr.
D243,531 S 3/1977 Strigle, Jr.
4,029,482 A 6/1977 Postma et al.
RE29,314 E 7/1977 Carlson et al.
RE29,315 E 7/1977 Carlson et al.
4,033,727 A 7/1977 Vautrain
4,041,113 A 8/1977 McKeown
4,067,936 A * 1/1978 Ellis ......................... B01J 19/30 261/DIG. 72
4,072,736 A 2/1978 Fattinger
4,076,888 A * 2/1978 Perugini .............. B01J 37/0018 427/244
4,086,307 A 4/1978 Glaspie
4,089,941 A * 5/1978 Villemin .................. B01J 19/30 252/373
4,110,418 A * 8/1978 Martin ..................... B01J 19/30 428/397
4,113,810 A 9/1978 Ikawa
4,115,269 A * 9/1978 Bennett ................... F28F 25/08 210/150
4,122,011 A * 10/1978 Strigle, Jr. ............... B01J 19/30 210/150
4,149,862 A 4/1979 Sewell, Sr.
4,155,960 A * 5/1979 Gerdes .................... C04B 33/13 261/DIG. 72
4,159,817 A * 7/1979 Ikawa ...................... B01J 19/30 261/95
4,188,197 A 2/1980 Amberkar et al.
4,195,043 A * 3/1980 Foote ....................... B01J 19/30 210/150
4,197,205 A 4/1980 Hirs
4,200,532 A 4/1980 Iwatani
4,203,935 A 5/1980 Hackenjos
4,208,284 A * 6/1980 Pretorius ............ B01D 11/0242 210/767
4,251,239 A 2/1981 Clyde et al.
4,275,019 A 6/1981 Bednarski
4,285,910 A 8/1981 Kennedy, Jr.
4,303,599 A * 12/1981 Strigle, Jr. ............... B01J 19/30 261/DIG. 72
4,329,318 A 5/1982 Le Grouyellec et al.
4,333,892 A * 6/1982 Ellis ......................... B01J 19/30 261/DIG. 72
4,333,893 A * 6/1982 Clyde ...................... B01J 19/30 210/150
4,342,643 A 8/1982 Kyan
4,360,339 A * 11/1982 Blaskowski .......... F23C 10/002 431/170
4,361,182 A * 11/1982 Michalak ............. F28D 19/041 165/8
4,374,020 A 2/1983 Trevino et al.
4,378,292 A 3/1983 Haase
4,380,529 A 4/1983 Gupta
4,382,046 A * 5/1983 Frohwerk ................. F28F 7/02 261/DIG. 11
4,385,988 A * 5/1983 Hypponen ................ C02F 3/10 D23/209
4,402,832 A 9/1983 Gerhold
4,425,285 A 1/1984 Shimoi
4,443,559 A 4/1984 Smith, Jr.
4,457,849 A 7/1984 Heinze
4,478,721 A 10/1984 Gerhold
4,481,155 A * 11/1984 Frohwerk ............. F28F 25/085 428/116
4,483,771 A 11/1984 Koch
4,486,481 A * 12/1984 Heitkamp ................. C02F 1/28 428/913
4,487,727 A 12/1984 Ballato, Jr.
4,496,498 A * 1/1985 Pluss ....................... F28F 25/08 261/95
4,504,396 A 3/1985 Vardi et al.
4,511,519 A 4/1985 Hsia
4,519,960 A 5/1985 Kitterman
4,522,767 A 6/1985 Billet
4,537,731 A 8/1985 Billet
4,541,967 A * 9/1985 Masaki .................... B01J 19/30 428/116
4,554,114 A 11/1985 Glen
4,568,595 A 2/1986 Morris
4,569,821 A 2/1986 Duperray et al.
4,575,435 A * 3/1986 Kuhl ........................ B01J 19/30 261/DIG. 74
4,576,763 A * 3/1986 Nutter ...................... B01J 19/30 96/290
4,579,647 A 4/1986 Smith
4,581,299 A 4/1986 Jager
4,600,544 A * 7/1986 Mix .................... B01F 25/4315 366/337
4,615,796 A 10/1986 Kramer
4,642,089 A 2/1987 Zupkas et al.
4,642,397 A 2/1987 Zinnen et al.
4,668,442 A 5/1987 Lang
4,669,890 A 6/1987 Peyrot
4,681,674 A 7/1987 Graven et al.
4,691,031 A 9/1987 Suciu et al.
4,708,852 A 11/1987 Helbling, Jr. et al.
4,711,930 A 12/1987 Hoelderick et al.
4,716,066 A 12/1987 Wymann
4,719,090 A 1/1988 Masaki
4,724,593 A 2/1988 Lang
4,726,825 A 2/1988 Natale
4,726,918 A * 2/1988 Carson .................... F28F 25/08 261/DIG. 72
4,731,205 A 3/1988 McNulty
4,749,493 A * 6/1988 Hicks ........................ C02F 3/24 210/150
4,775,460 A 10/1988 Reno
4,788,040 A 11/1988 Campagnolo et al.
4,798,676 A 1/1989 Matkovich
4,806,288 A * 2/1989 Nowosinski ............. B01J 19/30 366/337
4,810,685 A 3/1989 Twigg et al.
4,814,085 A * 3/1989 Fujii ........................ B01J 19/30 501/83
4,814,125 A * 3/1989 Fujii ....................... C04B 38/02 501/83
4,830,736 A 5/1989 Hung et al.
4,842,920 A 6/1989 Banai
4,849,569 A 7/1989 Smith, Jr.
4,859,642 A 8/1989 Hoelderick et al.
4,863,606 A 9/1989 Ryall

(56) References Cited

U.S. PATENT DOCUMENTS 4,863,712 A 9/1989 Twigg et al.
4,880,541 A 11/1989 Chiron et al.
4,938,422 A 7/1990 Koves
4,950,834 A 8/1990 Arganbright et al.
4,954,251 A 9/1990 Barnes et al.
4,968,651 A 11/1990 Crabtree
4,971,771 A 11/1990 Stahl
4,982,022 A 1/1991 Smith, Jr.
4,985,211 A 1/1991 Akihama et al.
5,013,426 A 5/1991 Dang Vu et al.
5,017,542 A 5/1991 Matan et al.
5,043,506 A 8/1991 Crossland
5,055,627 A 10/1991 Smith, Jr. et al.
5,104,546 A 4/1992 Filson et al.
5,112,536 A * 5/1992 McNulty .................. B01J 19/30 261/DIG. 72
5,113,015 A 5/1992 Palmer et al.
5,118,873 A 6/1992 Smith, Jr.
5,122,276 A 6/1992 Loikits
5,143,700 A 9/1992 Anguil
D331,793 S 12/1992 Erwes
5,177,961 A 1/1993 Whittenberger
5,188,772 A 2/1993 Yu
5,189,001 A 2/1993 Johnson
5,194,231 A * 3/1993 Gough .................... F28F 13/00 210/150
D334,970 S 4/1993 Tominaga
D334,971 S 4/1993 Tominaga
5,202,027 A 4/1993 Stuth
5,202,097 A 4/1993 Poussin
5,217,603 A 6/1993 Inoue et al.
5,217,616 A 6/1993 Sanyal
5,223,129 A * 6/1993 Hsieh ........................ C02F 3/06 210/150
5,229,015 A 7/1993 Keep
5,235,102 A 8/1993 Palmer et al.
5,236,663 A * 8/1993 Alagy ........................ B01J 8/02 422/142
5,243,115 A 9/1993 Smith, Jr. et al.
5,248,415 A 9/1993 Masuda
5,248,836 A 9/1993 Bakshi et al.
5,262,012 A * 11/1993 Smith, Jr. ................ B01J 19/30 261/95
5,275,790 A * 1/1994 Buchholz ............... B01D 3/009 422/216
D345,410 S 3/1994 Del Prete
5,298,164 A * 3/1994 Hapach ..................... C02F 3/06 210/615
5,298,226 A 3/1994 Nowobilski
5,304,423 A 4/1994 Niknafs et al.
5,314,645 A * 5/1994 Rukovena ................ B01J 19/30 261/DIG. 72
5,326,512 A 7/1994 Stillwagon et al.
5,336,656 A 8/1994 Campbell
5,338,518 A * 8/1994 Marion .................... B01J 8/048 422/142
5,368,722 A 11/1994 Bartholdy
5,384,300 A 1/1995 Feeley et al.
5,384,302 A 1/1995 Gerdes et al.
5,399,535 A 3/1995 Whitman
5,401,398 A 3/1995 McManus
5,409,375 A 4/1995 Butcher
5,411,681 A 5/1995 Seah
5,433,777 A * 7/1995 Sheppard ............ B28B 17/0018 106/400
5,446,223 A 8/1995 Smith, Jr.
5,454,947 A 10/1995 Olapinski et al.
5,458,779 A * 10/1995 Odegaard ............... C02F 3/085 210/150
5,458,817 A * 10/1995 Lang ........................ B01J 19/32 261/DIG. 72
5,476,978 A 12/1995 Smith, Jr. et al.
5,498,318 A * 3/1996 Alagy ...................... B01J 19/30 203/99
5,498,376 A * 3/1996 St. Louis ................. B01J 19/30 261/DIG. 72
5,510,056 A 4/1996 Jacobs et al.
5,512,530 A 4/1996 Gerdes et al.
5,523,503 A 6/1996 Funk et al.
5,525,270 A * 6/1996 Bhaga ...................... B01J 19/30 261/DIG. 72
5,538,544 A 7/1996 Nowobilski et al.
5,543,039 A * 8/1996 Odegaard ................. C02F 3/10 261/95
5,543,088 A 8/1996 Halbirt
5,558,029 A 9/1996 Peake
5,599,363 A 2/1997 Percy
5,624,547 A 4/1997 Sudhakar et al.
5,637,263 A * 6/1997 Lang ........................ B01J 19/30 261/DIG. 72
D381,394 S 7/1997 Lex, Jr. et al.
5,660,715 A 8/1997 Trimble et al.
5,670,095 A 9/1997 Southam
5,683,493 A * 11/1997 Stober .................... B01D 53/18 95/219
5,690,819 A 11/1997 Chianh
5,707,513 A 1/1998 Jowett
5,714,097 A * 2/1998 St. Louis ................. B01J 19/30 261/DIG. 72
5,730,916 A * 3/1998 Kunzel .................... B01J 19/30 264/29.7
5,747,143 A * 5/1998 Niknafs ................... B01J 19/30 210/150
5,766,290 A 6/1998 Zievers et al.
5,767,470 A 6/1998 Cha
5,779,886 A 7/1998 Couture
5,779,993 A 7/1998 Gentry
5,783,069 A * 7/1998 Frank ........................ C02F 3/10 210/150
5,785,851 A 7/1998 Morris et al.
5,799,596 A 9/1998 Peake
5,817,594 A 10/1998 McNamara et al.
5,853,579 A 12/1998 Rummier et al.
5,853,582 A 12/1998 Grangeon et al.
5,866,736 A 2/1999 Chen
5,873,998 A 2/1999 Grangeon et al.
5,882,772 A * 3/1999 Schultes .................. B01J 19/30 428/184
5,885,489 A * 3/1999 Horner ..................... B01J 19/30 261/DIG. 72
5,885,694 A * 3/1999 Schultes .................. B01J 19/32 428/184
5,895,572 A 4/1999 Joulin et al.
5,901,575 A 5/1999 Sunder
5,910,241 A 6/1999 McNamara et al.
5,919,493 A * 7/1999 Sheppard ................. B01J 19/32 425/408
5,935,896 A * 8/1999 Dupuis .................... B01J 19/30 502/414
5,938,328 A * 8/1999 Pinto .................... B01J 19/2415 366/174.1
5,943,969 A 8/1999 Peake
5,972,214 A 10/1999 Callebert et al.
5,980,739 A 11/1999 Jowett
6,007,915 A * 12/1999 Rukovena ................ B01J 19/30 428/397
6,019,810 A 2/2000 Phillips
6,024,871 A 2/2000 Harter et al.
6,033,629 A 3/2000 Friederick et al.
6,036,743 A 3/2000 Butcher et al.
6,096,278 A 8/2000 Gary
6,102,376 A * 8/2000 Fei ........................... B01J 19/30 261/DIG. 72
6,110,389 A 8/2000 Horowitz
6,117,812 A 9/2000 Gao et al.
6,126,829 A * 10/2000 Gunnarsson .............. C02F 3/10 210/150
6,153,094 A 11/2000 Jowett
6,156,197 A 12/2000 Dessapt et al.
6,182,950 B1 * 2/2001 Fan .......................... B01J 19/30 261/DIG. 72

(56) References Cited

U.S. PATENT DOCUMENTS 6,242,661 B1 6/2001 Podrebarac et al.
6,258,900 B1 7/2001 Glover et al.
6,262,131 B1 7/2001 Arcuri et al.
6,284,022 B1 9/2001 Sachweh et al.
6,291,603 B1 9/2001 Glover et al.
6,315,972 B1 11/2001 Mehdizadeh et al.
6,352,579 B1 3/2002 Hirata et al.
6,371,452 B1 4/2002 Shojaie
6,379,032 B1 4/2002 Sorensen
6,387,534 B1 5/2002 Niknafs
6,391,448 B1 * 5/2002 Geiser ........................ C02F 3/10 264/293
6,402,959 B1 6/2002 Dessapt et al.
6,454,948 B2 9/2002 Ferschneider et al.
D465,257 S 11/2002 Van Olst
6,481,325 B1 * 11/2002 Nagaoka ................. B21F 27/12 87/12
6,511,051 B2 * 1/2003 Kessler .................... B01J 19/32 422/239
6,521,562 B1 2/2003 Clem et al.
6,524,849 B1 2/2003 Adams
6,547,222 B2 * 4/2003 Blischak ............... F28D 17/005 165/DIG. 42
6,565,816 B1 * 5/2003 McNully .................... B01J 8/02 261/75
6,583,329 B1 6/2003 Podrebarac
6,624,114 B1 * 9/2003 Eberle ...................... B01J 23/22 502/527.24
6,630,078 B2 10/2003 Kourtakis et al.
6,631,890 B1 10/2003 Lau
6,666,436 B1 * 12/2003 Lerner ..................... B01J 19/30 261/95
6,685,826 B1 * 2/2004 James ...................... B01J 19/30 210/150
6,699,562 B2 * 3/2004 Niknafs ................. B01D 53/02 165/172
6,709,574 B2 * 3/2004 James ....................... C02F 3/10 210/150
6,713,772 B2 3/2004 Goodman et al.
6,726,838 B2 * 4/2004 Shechter ................ C12M 25/14 210/197
6,797,175 B2 9/2004 Hotier
6,811,147 B2 11/2004 Lau
6,835,224 B2 12/2004 Cheng
6,852,227 B1 2/2005 Petrone
6,855,272 B2 * 2/2005 Burlingame ............. B01J 19/30 422/198
6,889,963 B2 * 5/2005 Niknafs ................. B01D 53/02 428/116
6,890,878 B2 5/2005 Moore
7,014,175 B2 3/2006 Honnell
7,125,490 B2 10/2006 Clendenning et al.
7,129,195 B2 * 10/2006 Felder ...................... B01J 19/30 502/316
7,189,323 B2 * 3/2007 Lofqvist ................... C02F 3/10 210/615
7,246,795 B2 * 7/2007 Niknafs ................... B01J 19/30 261/DIG. 72
7,255,848 B2 8/2007 Deluga et al.
7,255,917 B2 8/2007 Rochlin et al.
7,265,189 B2 9/2007 Glover
7,303,668 B2 12/2007 Liao
7,314,551 B2 1/2008 Frey et al.
7,354,879 B2 * 4/2008 Reid ........................ B01J 19/30 501/141
7,390,403 B2 6/2008 Siwak
7,393,510 B2 7/2008 Glover
7,427,385 B2 9/2008 Scheirer et al.
7,468,134 B2 * 12/2008 Hoang ................. A01K 63/045 210/287
7,488,413 B2 2/2009 Badreddine
7,490,816 B2 * 2/2009 Kavolik, Jr. ............. B01J 19/30 261/DIG. 72
7,510,172 B2 * 3/2009 Kojima .................. B01D 53/18 96/326
7,527,671 B1 5/2009 Stuecker et al.
7,544,288 B1 6/2009 Cook
7,566,428 B2 7/2009 Warner et al.
7,632,320 B2 12/2009 Tonkovich et al.
7,637,485 B2 12/2009 Honnell
D611,120 S * 3/2010 Brockdorff .................. D23/207
D612,007 S * 3/2010 Brockdorff .................. D23/207
7,708,957 B2 * 5/2010 Reid ....................... C04B 38/00 501/141
7,722,832 B2 5/2010 Glover et al.
7,722,945 B2 * 5/2010 Nieuwoudt .............. B01J 19/30 428/174
D618,760 S * 6/2010 Flournoy ..................... D23/207
7,741,502 B2 6/2010 Lecocq et al.
7,748,688 B2 7/2010 Bessettes
7,753,080 B2 * 7/2010 Liu ............................ B01J 8/06 366/337
7,775,507 B2 * 8/2010 Niknafs ................... B01J 19/30 261/DIG. 72
D623,719 S * 9/2010 Lees ............................ D23/207
7,799,730 B2 * 9/2010 Ringer ..................... B01J 19/30 502/328
7,862,013 B2 * 1/2011 Miller ...................... B01J 19/30 261/DIG. 72
D645,116 S * 9/2011 McKean ...................... D23/207
D645,159 S * 9/2011 Loken .......................... D23/209
D645,161 S * 9/2011 Loken .......................... D23/209
D648,821 S * 11/2011 McKean ...................... D23/207
8,048,820 B2 * 11/2011 Brandstadter ............ B01J 19/30 502/212
8,062,521 B2 11/2011 Glover
8,062,712 B2 * 11/2011 Meneghini ................ C25B 1/44 204/278
8,088,278 B2 * 1/2012 Poltorak ............... C02F 3/2806 210/150
D661,778 S * 6/2012 Dempster .................... D23/207
8,216,531 B2 * 7/2012 Burlingame ............ C01B 3/382 165/161
8,235,361 B2 * 8/2012 Feinstein ................. B01J 19/32 261/106
8,241,717 B1 8/2012 Anderson
8,282,890 B2 10/2012 Niknafa et al.
8,293,195 B2 10/2012 Blanchard
8,313,709 B2 11/2012 Glover
D672,009 S 12/2012 Flournoy
8,500,852 B2 8/2013 Galbraith
8,505,884 B2 * 8/2013 Alix ......................... B01J 19/32 261/95
8,524,076 B2 9/2013 Yang
8,524,164 B2 9/2013 Glover
8,550,157 B2 10/2013 O'Malley
D696,744 S * 12/2013 Barrett ......................... D23/207
D697,168 S * 1/2014 Rusten ......................... D23/207
8,663,474 B2 3/2014 Niazi
8,673,245 B2 * 3/2014 Tanimoto ................. B01J 19/30 422/631
D705,499 S 5/2014 Zamarripa
8,747,532 B2 * 6/2014 Chang ...................... B01J 19/30 96/290
8,821,729 B2 * 9/2014 Pajuniemi .............. B01J 10/002 210/615
D718,412 S * 11/2014 Flournoy ..................... D23/207
9,039,987 B2 * 5/2015 Sherman .................. B01J 19/30 422/211
9,056,268 B2 6/2015 Jones et al.
9,101,863 B2 8/2015 Glover
9,157,689 B2 * 10/2015 Hartvigsen ............... F28F 1/40
9,205,392 B2 12/2015 Byl et al.
9,339,808 B2 * 5/2016 Cotter .................... B01J 10/007
9,352,292 B2 5/2016 Solantie et al.
D762,279 S * 7/2016 Flournoy ..................... D23/207
9,440,216 B2 * 9/2016 Ryan ........................ B01D 3/28
9,452,412 B2 * 9/2016 Ausner ............... B01F 23/2322
D780,286 S 2/2017 Ausner
D785,132 S * 4/2017 Jackson ....................... D23/209
9,732,774 B1 8/2017 Glover

(56) References Cited

U.S. PATENT DOCUMENTS 9,925,526 B2 * 3/2018 Hammon ............... B01J 23/002
9,975,106 B2 * 5/2018 Schultes .................. B01J 19/30
10,011,042 B2 * 7/2018 Crawford ................ B01J 19/30
10,054,140 B2 8/2018 Glover et al.
10,161,428 B2 12/2018 Glover et al.
D839,496 S * 1/2019 Steinkraus .................. D30/160
D839,497 S * 1/2019 Steinkraus .................. D30/160
10,196,597 B2 * 2/2019 Assulin .................. B29C 48/22
10,253,267 B2 * 4/2019 McLemore ............ B01D 46/00
10,407,348 B2 9/2019 Osborne
10,421,067 B2 9/2019 Glover
10,421,068 B2 9/2019 Glover
10,449,531 B2 10/2019 Glover
10,500,581 B1 12/2019 Glover
10,525,456 B2 1/2020 Glover
10,543,483 B2 1/2020 Glover
10,557,486 B2 2/2020 Glover et al.
10,569,214 B2 * 2/2020 Bois ......................... B01J 20/12
10,655,654 B2 5/2020 Glover et al.
10,662,986 B2 5/2020 Glover
10,744,426 B2 * 8/2020 Glover ............... B01D 21/0087
10,744,481 B2 * 8/2020 Tikhonov ................ B01J 19/30
10,843,164 B2 * 11/2020 Xie .......................... B01J 19/32
10,864,465 B2 12/2020 Boyd
10,876,553 B2 12/2020 Glover et al.
10,888,835 B2 * 1/2021 Xie .......................... B01J 19/30
10,920,807 B2 2/2021 Glover et al.
10,981,787 B2 * 4/2021 Jeng .................... C01B 13/0211
11,000,785 B2 * 5/2021 Glover .................... B01J 19/30
11,156,240 B2 10/2021 Glover et al.
11,358,115 B2 * 6/2022 Norell ..................... B01J 19/30
11,426,681 B2 * 8/2022 Jackson ................. B01D 24/40
11,541,418 B2 * 1/2023 Murat Hocaoglu ..... B01J 19/30
11,583,826 B2 * 2/2023 Geipel .................... B01J 19/30
11,731,097 B2 * 8/2023 Belstrup ................. B01J 19/30
422/216
11,752,477 B2 9/2023 Glover et al.
11,754,100 B2 9/2023 Glover et al.
11,806,671 B2 * 11/2023 Ryan ....................... B01D 3/28
11,918,474 B2 * 3/2024 Jones ........................ A61F 2/30
11,951,420 B2 * 4/2024 Jackson ............... A01K 63/045
12,036,533 B2 * 7/2024 Stuckey ................... B01J 19/30
12,145,125 B2 * 11/2024 Spuller .................... B01J 19/30
12,168,213 B2 * 12/2024 Charra ...................... C07C 2/08
12,247,596 B2 3/2025 Glover et al.
12,303,859 B2 * 5/2025 Sankar ..................... B01J 19/30
12,515,190 B2 * 1/2026 Nieuwoudt .............. B01J 19/30
2001/0015336 A1 8/2001 Glover
2001/0026876 A1 * 10/2001 Kessler .................... B01J 19/32
428/606
2001/0042928 A1 11/2001 Nagaoka
2002/0059786 A1 5/2002 Nagaoka
2002/0073669 A1 * 6/2002 Nagaoka ................. B21F 27/10
55/525
2002/0092414 A1 7/2002 Nagaoka
2002/0146358 A1 10/2002 Smith et al.
2003/0001292 A1 * 1/2003 Nagaoka .................. B01J 19/32
261/94
2003/0001293 A1 * 1/2003 Nagaoka .................. B01J 19/32
96/363
2003/0116871 A1 * 6/2003 Ringo ...................... B01J 19/32
261/DIG. 72
2003/0125594 A1 7/2003 Moore
2003/0127378 A1 * 7/2003 Shechter ................. C02F 3/223
210/150
2003/0146524 A1 8/2003 Niknafs
2003/0160342 A1 * 8/2003 Niknafs ................... B01J 19/30
261/DIG. 72
2003/0161992 A1 * 8/2003 Niknafs ................... B01J 19/30
428/118
2004/0031729 A1 2/2004 Meier et al.
2004/0041284 A1 * 3/2004 Lau .......................... B01J 19/30
261/DIG. 72
2004/0043493 A1 3/2004 Kobayashi
2004/0054222 A1 * 3/2004 Felder ...................... B01J 19/30
562/547
2004/0084352 A1 5/2004 Meier et al.
2004/0166284 A1 * 8/2004 Niknafs ................... B01J 19/30
428/116
2004/0170804 A1 * 9/2004 Niknafs ................. B01D 53/50
428/118
2004/0192862 A1 9/2004 Glover et al.
2004/0225085 A1 11/2004 Glover et al.
2005/0098908 A1 * 5/2005 Honnell ................... B01J 19/30
261/DIG. 72
2005/0164009 A1 * 7/2005 Rieke ....................... B01J 19/30
427/532
2005/0211644 A1 9/2005 Goldman
2005/0240038 A1 10/2005 Gobbel et al.
2005/0255014 A1 11/2005 Glover
2006/0009648 A1 1/2006 Gobbel et al.
2006/0108274 A1 5/2006 Frey et al.
2006/0151366 A1 * 7/2006 Hoang ................. A01K 63/045
210/95
2006/0194019 A1 * 8/2006 Niknafs ............... B01J 19/2485
428/116
2006/0196826 A1 9/2006 Glover
2006/0202364 A1 * 9/2006 Honnell ................... B01J 19/30
261/DIG. 72
2006/0204414 A1 * 9/2006 Warner .................... B01J 19/30
422/211
2006/0251555 A1 11/2006 Warner et al.
2006/0275185 A1 12/2006 Tonkovich et al.
2006/0292046 A1 12/2006 Fruchey et al.
2007/0007201 A1 * 1/2007 Lupton .................... B01J 19/30
210/605
2007/0155612 A1 * 7/2007 Reid ........................ B01J 19/30
264/632
2007/0158277 A1 7/2007 Bachand et al.
2007/0182035 A1 * 8/2007 Kavolik, Jr. ............. B01J 19/30
261/DIG. 72
2007/0186988 A1 * 8/2007 Liu ....................... B01F 25/431
138/113
2007/0187314 A1 8/2007 Sambrook
2007/0205523 A1 * 9/2007 Kojima .................. B01D 53/18
261/79.2
2007/0219279 A1 * 9/2007 Leveson .............. B01J 19/2485
518/716
2007/0265357 A1 11/2007 Iversen et al.
2008/0029201 A1 * 2/2008 Niknafs ................... B01J 19/30
156/87
2008/0044316 A1 2/2008 Glover
2008/0085400 A1 * 4/2008 Nieuwoudt .............. B01J 19/30
428/174
2008/0093751 A1 * 4/2008 Miller ...................... B01J 19/30
261/DIG. 72
2008/0164625 A1 * 7/2008 Niknafs ................... B01J 19/30
261/DIG. 72
2008/0181054 A1 * 7/2008 Kojima .................... B01J 19/30
366/349
2008/0187470 A1 * 8/2008 Reid ....................... F23G 7/068
422/240
2008/0245743 A1 10/2008 Dew
2008/0257804 A1 10/2008 Dew
2008/0257805 A1 10/2008 Dew
2008/0277315 A1 * 11/2008 Ringer ..................... B01J 19/30
502/328
2008/0296216 A1 12/2008 Glover
2009/0039017 A1 * 2/2009 Uphoff ..................... B01J 19/30
210/615
2009/0044702 A1 2/2009 Adamek et al.
2009/0115077 A1 * 5/2009 Niknafs ................... B01J 19/30
261/95
2009/0146339 A1 6/2009 Malone et al.
2009/0211441 A1 8/2009 Reyes et al.
2009/0283479 A1 11/2009 Warner et al.
2009/0306410 A1 * 12/2009 Brandstadter ............ B01J 19/30
502/209
2010/0087695 A1 * 4/2010 Cotter .................... B01J 10/007
585/700

(56) References Cited

U.S. PATENT DOCUMENTS

2010/0101994 A1* 4/2010 Poltorak ................ C02F 3/288 210/497.01
2010/0209315 A1 8/2010 Niknafs
2010/0230832 A1* 9/2010 Nieuwoudt .............. B01J 19/30 261/94
2010/0243519 A1 9/2010 Glover et al.
2010/0243520 A1 9/2010 Glover et al.
2011/0114288 A1* 5/2011 Miller ...................... B01J 19/30 165/185
2011/0200478 A1 8/2011 Billiet
2012/0040455 A1* 2/2012 Dorge .................... C12M 25/16 435/243
2012/0197056 A1* 8/2012 Cotter .................... B01J 10/007 428/44
2012/0211430 A1 8/2012 Choi
2012/0211438 A1 8/2012 Glover
2012/0237434 A1 9/2012 Blanchard et al.
2013/0058843 A1* 3/2013 Sherman ................. B29C 48/11 264/150
2013/0153188 A1* 6/2013 Wang ....................... B01J 8/025 165/185
2013/0178627 A1 7/2013 Freitas, Jr.
2013/0184461 A1 7/2013 Freitas, Jr.
2013/0306562 A1 11/2013 Stifter et al.
2014/0084496 A1* 3/2014 Miller ...................... B01J 19/30 53/473
2014/0134067 A1* 5/2014 Hartvigsen ............... F28F 1/40 165/170
2014/0190882 A1* 7/2014 Yellen ....................... C02F 3/20 210/322
2014/0291224 A1 10/2014 Fujita
2015/0048528 A1* 2/2015 Barton .................. F28F 25/087 261/95
2015/0053627 A1 2/2015 Silin et al.
2015/0069663 A1* 3/2015 Ausner ............... B01F 23/2321 165/185
2015/0129512 A1 5/2015 Thiyagarajan
2015/0336079 A1* 11/2015 Xie .......................... B01J 19/30 261/95
2016/0136603 A1 5/2016 Parihar et al.
2016/0228848 A1* 8/2016 Schultes .................. B01J 19/30
2016/0376175 A1* 12/2016 Welander .................. C02F 3/08 435/299.1
2017/0015969 A1* 1/2017 Assulin ................. B29C 48/155
2017/0106361 A1* 4/2017 Reid ........................ B01J 19/30
2017/0189834 A1* 7/2017 Glover ............... B01D 21/0012
2017/0190075 A1* 7/2017 Crawford ................. B01J 19/30
2017/0234339 A1 8/2017 Glover
2017/0361312 A1* 12/2017 Leal ......................... B01J 21/04
2018/0008952 A1 1/2018 Glover
2018/0023598 A1 1/2018 Glover
2018/0093207 A1* 4/2018 Glover ............... B01D 21/0012
2018/0093930 A1 4/2018 Freitas, Jr.
2018/0264681 A1* 9/2018 Crawford ................ B01J 19/30
2018/0296947 A1* 10/2018 Jackson ................. B01D 24/10
2018/0297005 A1* 10/2018 Xie ..................... B01F 23/2322
2018/0297006 A1* 10/2018 Xie ......................... B01F 23/29
2019/0002280 A1* 1/2019 Jeng .................. A61M 16/1005
2019/0046901 A1 2/2019 Boyd
2019/0048903 A1 2/2019 Glover et al.
2019/0118170 A1* 4/2019 Reid ........................ B01J 19/30
2019/0177181 A1 6/2019 St. Germain
2019/0217283 A1 7/2019 Glover et al.
2019/0242412 A1 8/2019 Glover et al.
2019/0285098 A1 9/2019 Glover et al.
2019/0299189 A1* 10/2019 Norell ...................... B01D 3/28
2019/0301498 A1 10/2019 Glover
2019/0301499 A1 10/2019 Glover
2019/0358620 A1 11/2019 Glover
2020/0129954 A1* 4/2020 Tikhonov ................. B01J 19/30
2020/0149564 A1 5/2020 Glover
2020/0215524 A1 7/2020 Glover
2020/0306721 A1* 10/2020 Li ........................... B01J 19/30
2020/0338518 A1 10/2020 Bakli et al.
2020/0376413 A1* 12/2020 Glover ................... B01D 3/008
2020/0376414 A1* 12/2020 Glover ............... B01D 21/0087
2021/0018022 A1 1/2021 Glover
2021/0188675 A1* 6/2021 Murat Hocaoglu ..... B01J 19/30
2021/0220799 A1* 7/2021 Spuller .................... B01J 19/30
2021/0316270 A1* 10/2021 Geipel ..................... B01J 19/30
2021/0317020 A1* 10/2021 Barrett ..................... B01J 19/30
2021/0339229 A1* 11/2021 Stuckey ................... B01J 19/30
2022/0032253 A1* 2/2022 Belstrup .................. B01J 19/30
2022/0042528 A1 2/2022 Glover
2022/0072495 A1 3/2022 Glover
2022/0274086 A1* 9/2022 Norell ...................... B01D 3/32
2022/0288554 A1* 9/2022 Sankar ..................... B01J 19/30
2023/0158472 A1* 5/2023 Nieuwoudt .............. B01J 19/30 261/108
2023/0278021 A1* 9/2023 Kaufman Rechulski .................... B01J 19/30 502/439
2023/0285949 A1* 9/2023 Fathi ...................... B01J 10/007
2023/0348304 A1* 11/2023 Magnusson .............. B01J 19/30
2023/0407892 A1 12/2023 Glover
2024/0017238 A1* 1/2024 Stuckey ................... B01J 19/30
2024/0066484 A1 2/2024 Glover
2024/0335821 A1* 10/2024 Stuckey ................... B01J 19/30
2024/0351013 A1* 10/2024 Stuckey ................... B01J 19/30
2025/0018360 A1* 1/2025 Even ........................ B01J 19/32

FOREIGN PATENT DOCUMENTS

CA 2019928 12/1991
CA 2520071 4/2004
CA 2297113 2/2005
CA 2570527 12/2005
CN 202072546 12/2011
CN 203382593 1/2014
DE 585595 10/1933
DE 3539195 5/1986
EP 73150 10/1933
EP 260826 3/1988
EP 576096 12/1993
EP 639544 2/1995
EP 651041 5/1995
EP 719578 7/1996
EP 1001837 7/1998
EP 0899011 3/1999
EP 1606038 12/2005
EP 1755766 2/2007
EP 3040119 6/2016
EP 3397364 11/2018
EP 3414003 12/2018
FR 2480137 10/1981
FR 2851559 8/2004
GB 267877 1/1927
GB 374707 7/1932
GB 429616 6/1935
GB 933124 8/1963
GB 1097473 1/1968
GB 1442085 7/1976
GB 2108003 5/1983
GB 2149771 6/1985
JP S49-145763 12/1974
JP S5171840 U 6/1976
JP 5237396 9/1977
JP S558819 1/1980
JP SHO 55-43817 3/1980
JP 5567309 5/1980
JP 5817818 2/1983
JP S58 (1983)-024308 2/1983
JP S61 (1986)-134300 6/1986
JP 61132097 8/1986
JP S61 (1986)-180818 8/1986
JP 62114643 5/1987
JP SHO 62-114643 5/1987
JP S63 (1988)-043632 3/1988
JP 4187297 7/1992
JP H06 (1994)-205922 7/1994
JP 1028876 2/1998
JP HEI 10-028876 2/1998
JP 1057821 3/1998

(56) References Cited

FOREIGN PATENT DOCUMENTS

| | | |
|---|---|---|
| JP | HEI 10-057821 | 3/1998 |
| JP | 11128734 | 5/1999 |
| JP | 2000-028876 | 1/2000 |
| JP | 2000-246048 | 9/2000 |
| JP | 2003-120257 | 4/2003 |
| JP | 2004-515432 | 5/2004 |
| JP | 2004-250554 | 9/2004 |
| JP | 2004-530746 | 10/2004 |
| JP | 2004-537406 | 12/2004 |
| JP | 2006-55749 | 3/2006 |
| JP | 2006-205068 | 8/2006 |
| JP | 2006-523139 | 10/2006 |
| JP | 2007-514529 | 6/2007 |
| JP | 2008-545527 | 12/2008 |
| JP | 5543817 | 7/2014 |
| JP | 2015-085208 | 5/2015 |
| JP | 2016-13748 | 8/2016 |
| JP | 2018-61955 | 4/2018 |
| JP | 6324420 | 5/2018 |
| JP | 2019-19023 | 2/2019 |
| KR | 10-2006-0016746 | 2/2006 |
| KR | B0747359 | 8/2007 |
| KR | 1221298 | 1/2013 |
| KR | B1417049 | 7/2014 |
| KR | 10-2239550 | 4/2021 |
| NL | 1009499 | 1/2000 |
| NZ | 542787 | 6/2009 |
| WO | 99/03561 | 1/1999 |
| WO | 2001/001536 | 1/2001 |
| WO | 2002/045838 | 6/2002 |
| WO | 2002/079346 | 10/2002 |
| WO | 2003/013725 | 2/2003 |
| WO | 2004/094039 | 11/2004 |
| WO | 2005/058472 | 6/2005 |
| WO | 2005/123221 | 12/2005 |
| WO | 2006/127671 | 11/2006 |
| WO | 2010/149908 | 12/2010 |
| WO | 2015/037730 | 3/2015 |
| WO | 2015/200513 | 12/2015 |
| WO | 2017/117492 | 7/2017 |
| WO | 2017/139597 | 8/2017 |
| WO | 2019/020705 | 1/2019 |
| WO | 2022/056154 | 3/2022 |
| ZA | 200508048 | 11/2006 |

OTHER PUBLICATIONS

European Patent Office; Communication Pursuant to Article 94(3) EPC, issued in conneciton to application No. EP15192642.5; Sep. 10, 2020; 5 pages; Europe.

Intellectual Property Office of Singapore; Invitation to Respond to Written Opinion, issued in connection to application No. 11201805491X; Aug. 18, 2020; 6 pages; Singapore.

Japanese Patent Office; Final Rejection, issued in connection to application No. 2018-541647; Jul. 22, 2020; 4 pages; Japan.

Schildhauer; Application of Film-Flow-Monoliths . . . , Technical Univesity Delft; Julianalaan 136, NL-2628 BL Delft; The Netherlands; 1 page; Oct. 29, 2003.

Scheffler, Michael; Cellular Ceramics: Structure, Manufacturing, Properties and Applications; Die Beutsche Bibliotheck; 2005; 5 pages; Germany.

Schlichting, Boundary-Layer Theory; McGraw-Hill; (Translation of Grenzschicht-Theorie, Translated by Dr. J. Kestin), 1979; pp. 230-234.

Selee Corporation; Product Brochure; 6 pages; 1997.

Selee Corporation Home Page; Internet; downloaded Nov. 14, 1996; 3 pages.

Selee Corporation; Ceramic Foam for Thermal/Kiln Furniture Applications; Ceramic Foam Kiln Furniture Phusical Property Data Sheet; Nov. 14, 1996; 2 pages.

Sinter Metals; High Porosity SIKA-R . . . IS; Porous Metals Filter Elements; 3 pages.

Sinter Metals; Tool List, Seamleass SILKA-Elements; 2 pages.

Sinter Metals; Hight Porosity Sintered Materials; p. 1-16.

Snyder Filtration; Nanofiltration Membranes; Retrieved Jun. 15, 2016 from: http://synderfiltration.com/nanofiltration/membranes/; 4 pages; Membrane Technology.

Strom et al.; Advanced Reticulated Ceramics; Hi-Tech Ceramics; p. 14-19.

Sulzer; Structured Packings for Separation and Reactive Distillation Brochure; pp. 2-27; 2002-2003.

Sweeting et al.; High Surface Reticulated Ceramics for Catalytic Applications; Mat., Res. Soc. Symp. Proc., vol. 549; pp. 17-23; 1999.

Sweeting et al.; Reticulated Ceramics for Catalyst Support Applications; Hi-Tech Ceramics, Inc.; Nov. 30, 1994; 12 pages.

Tan-Atichat and Nagib, "Interaction of free-stream turbulence with screens and grids: a balance between turbulence scales" J. Fluid Mech (1982), vol. 114, pp. 501-528; Great Britain.

Wadley; Cellular Metals Manufacutring; Advanced Engineering Materials; 4; No. 10; pp. 726-733; 2002.

Woodward et al.; Akzo Chemicals' Guard Bed Technology; 16 pages; 1991.

U.S. Patent and Trademark Office; Non-Final Office Action, Issued in Connection with U.S. Appl. No. 11/893,190, filed Mar. 10, 2010; 6 pages; U.S.

Applicant; Amendment and Response, Filed in Connection with U.S. Appl. No. 11/893,190, filed Aug. 20, 2010; 4 pages; U.S.

U.S. Patent and Trademark Office; Final Office Action, Issued in Connection with U.S. Appl. No. 11/893,190, filed Nov. 3, 2010; 5 pages; U.S.

Applicant; Response to Final Office Action, Filed in Connection with U.S. Appl. No. 11/893,190, filed Jan. 3, 2011; 5 pages; U.S.

U.S. Patent and Trademark Office; Non-Final Office Action, Issued in Connection with U.S. Appl. No. 11/893,190, filed Jan. 19, 2011; 5 pages; U.S.

Applicant; Amendment and Response, Filed in Connection with U.S. Appl. No. 11/893,190, filed Jul. 19, 2011; 4 pages; U.S.

U.S. Patent and Trademark Office; Final Office Action, Issued in Connection with U.S. Appl. No. 11/893,190, filed Sep. 22, 2011; 6 pages; U.S.

Applicant; Amendment and Response, Filed in Connection with U.S. Appl. No. 11/893,190, filed Dec. 16, 2011; 5 pages; U.S.

U.S. Patent and Trademark Office; Non-Final Office Action, Issued in Connection with U.S. Appl. No. 11/893,190, filed Jan. 27, 2012; 7 pages; U.S.

U.S. Patent and Trademark Office; Non-Final Office Action, Issued in Connection with U.S. Appl. No. 11/893,190, filed Feb. 6, 2012; 7 pages; U.S.

Applicant; Amendment and Response, Filed in Connection with U.S. Appl. No. 11/893,190, filed Aug. 3, 2012; 6 pages; U.S.

U.S. Patent and Trademark Office; Final Office Action, Issued in Connection with U.S. Appl. No. 11/893,190, filed Oct. 23, 2012; 9 pages; U.S.

Applicant; Amendment and Response, Filed in Connection with U.S. Appl. No. 11/893,190, filed Dec. 24, 2012; 8 pages; U.S.

U.S. Patent and Trademark Office; Advisory Action Before the Filing of an Appeal Brief, Issued in Connection with U.S. Appl. No. 11/893,190, filed Jan. 11, 2013; 3 pages; U.S.

Applicant; Amendment and Response, Filed in Connection with U.S. Appl. No. 11/893,190, filed Feb. 25, 2013; 4 pages; U.S.

U.S. Patent and Trademark Office; Notice of Allowance and Fee(s) Due, Issued in Connection with U.S. Appl. No. 11/893,190, filed May 2, 2013; 8 pages; U.S.

U.S. Court of Appeals Federal Circuit; *Purdue Pharma L.P.* v. *Faulding Inc.*, 56 USPQ2d 1481 (CA FC 2000); Oct. 25, 2000; 11 pages.

Selected relevant excerpts from file history of U.S. Appl. No. 11/893,190, filed Aug. 15, 2007 and assigned to Applicant for present application.

Notice of Allowance for U.S. Appl. No. 10/867,015 (now U.S. Pat. No. 7,393,510, issued Jul. 1, 2008).

Observations submitted in connection to JP2017-226648; Jul. 17, 2018; 50 pages; Japan.

(56) References Cited

OTHER PUBLICATIONS

New Zealand Intellectual Property Office; Further Examination Report, issued in connection to application No. 743891; Jun. 24, 2019; 9 pages; New Zealand.
Japanese Patent Office; Observation, issued in connection to JP2018-541647;Jun. 19, 2019; 40 pages; Japan.
The Japan Petroleum Institute; Petroleum Refining Process; Kodansha Ltd.; May 20, 1998; 6 pages; Japan.
Chen, Xiaodong et al.; Improving the Strength of ZTA Foams with Different Strategies: Immersion Infiltration and Recoating; www.mdpi.com/journal/material; May 30, 2017; 15 pages.
Intellectual Property Office of Singapore; Written Opinion, issued in connection to application No. 11201805367W; Aug. 16, 2019; 7 pages; Singapore.
Intellectual Property Office of Singapore; Written Opinion, issued in connection to application No. 11201805491X; Aug. 29, 2019; 6 pages; Singapore.
Intellectual Property India; Examination Report, issued in connection to application No. 201837023710; Aug. 28, 2019; 6 pages; India.
Government of Chile, Ministry of Economy, Promotion and Tourism; Examiner's Report and Search Report, issued in connection to application No. 201801799; Aug. 9, 2019; 14 pages; Chile.
Canadian Intellectual Property Office; Official Action and Examination Search Report, issued in connection with CA3009845; Aug. 28, 2019; 4 pages; Canada.
Saint-Gobain Norpro; Denstone® Deltrap® Support Media; 6 pages; printed Oct. 1, 2019; https://www.horpro.saint-gobain.com/support-media/denstone-deltap.
Saint-Gobain Norpro; Tools Help Optimize Selection of Denstone® Bed Support Media; Apr. 4, 2019; 4 pages; https://www.norpro.saint-gobain.com/articles/tools-help-optimize-selection-denstone-bed-support-media-article.
Chilean Patent and Trademark Office; Examiner Report, issued in connection to application No. 2131-2018; 17 pages; Aug. 29, 2019; Chile.
Chilean Patent and Trademark Office; Search Report, issued in connection to application No. 2131-2018; 3 pages; Aug. 29, 2019; Chile.
Japanese Patent Office; Notice of Reasons for Rejection, issued in connection to JP2018-541647; Aug. 28, 2019; 14 pages; Japan.
Korean Intellectual Property Office; Notification of Provisional Rejection, issued in connection to application No. 10-2018-7021988; Oct. 22, 2019; 7 pages; Korea.
European Patent Office; Communication Pursuant to Article 94(3) EPC, issued in connection to EP17706648.7: Oct. 24, 2019; 7 pages; Europe.
Korean Intellectual Property Office; Notification of Provisional Rejection, issued in connection to application No. 10-2018-7026274; Oct. 22, 2019; 14 pages; Korea.
Australian Government, Ip Australia, Examination Report No. 2 for Standard Patent Application, Issued in connection to AU2016381170; 3 pages; Nov. 8, 2019; Australia.
Japanese Patent Office; Final Rejection, issued in connection to application No. 2017-226648; Feb. 26, 2020; 6 pages; Japan.
Chilean Patent and Trademark Office; Examiner Report No. 2., issued in connection to application No. 1799-2018; Jan. 24, 2020; 12 pages; Chile.
European Patent Office; Communication pursuant to Article 94(3) EPC, issued in connection to EP16834162.6; Feb. 4, 2020; 7 pages; Europe.
Japanese Patent Office; Office Action, issued in connection to application No. 2018-553847; Feb. 26, 2020; 8 pages; Japan.
Intellectual Property Office of Singapore; Invitation to Respond to Written Opinion, issued in connection with application No. 11201805491X; Mar. 3, 2020; 6 pages; Singapore.
Indian Patent Office; Examination Report, issued in connection to application No. 201837023720; Jan. 23, 2020; 6 pages; India.
Intellectual Property Office of Singapore; Invitation to Respond to Written Opinion, issued in connection with application No. 11201805367W; Mar. 2, 2020; 34 pages; Singapore.
National Institute of Industrial Property of Brazil; Office Action, issued in connection to application No. BR112018013488-0; Feb. 2, 2020; 4 pages; Brazil.
Canadian Intellectual Property Office; Office Action, issued in connection to application No. 3009825; Apr. 22, 2020; 3 pages; Canada.
Japanese Patent Office; Statement of Submission of Publication by third part, filed in connection to application No. 2019-140168; Aril 21, 2020; 1 page; Japan.
Kabe, Toshiaki; Hydrotreating—Science and Technology; Oct. 20, 2000; pp. 367-379; IPC KK.
Canadian Intellectual Property Office; Examiner Report, issued in connection to application No. CA3009845; May 20, 2020; 3 pages; Canada.
Japanese Patent Office; Statement of Submission of Publication by third part, filed in connection to application No. 2018-541647; Jun. 25, 2020; 3 page; Japan.
Korean Intellectual Property Office; Office Action, issued in connection to patent application No. 10-2020-7011514; Jul. 20, 2020; 11 pages; Korea.
European Patent Office; Communication Pursuant to Article 94(3)EPC, issued in connection to application No. 182013703.6; Jul. 27, 2020; 5 pages; Europe.
Australian Government, IP Australia, Examination Report No. 1 for Standard Patent Application, Issued in connection to AU2017217834; 3 pages; Nov. 14, 2018; Australia.
Australian Government, IP Australia, Examination Report No. 1 for Standard Patent Application, Issued in connection to AU2016381170; 3 pages; Apr. 10, 2019; Australia.
Brazilian National Institute of Industrial Property; Technical Examination Report, issued in connection to PI0613275-8; Feb. 25, 2016; 16 pages; Brazil.
Canadian Intellectual Property Office; Official Action, issued in connection with CA3009825; Jun. 18, 2019; 4 pages; Canada.
Chilean Patent and Trademark Office; Abstract Publication of CL2131-2018; Sep. 28, 2018; 1 page; Chile.
European Patent Office; PCT International Search Report, Issued in Connection to PCT/US2005/020712; Mar. 3, 2006; 2 pages; Europe.
European Patent Office; PCT International Search Report, Issued in Connection to PCT/US2004/006366; Oct. 20, 2004; 2 pages; Europe.
European Patent Office; PCT International Search Report, Issued in Connection to PCT/US2006/019854; Jan. 17, 2007; 2 pages; Europe.
European Patent Office; PCT Written Opinion of the International Searching Authority, Issued in Connection to PCT/US2006/019854; Jan. 17, 2007; 5 pages; Europe.
European Patent Office; PCT International Search Report, Issued in Connection to PCT/US98/14768; Nov. 26, 1998; 3 pages; Europe.
European Patent Office; PCT International Search Report, Issued in Connection to PCT/US2016/069396; Mar. 31, 2017; 3 pages; Europe.
European Patent Office; PCT Written Opinion of the International Searching Authority, Issued in Connection to PCT/US2016/069396; Mar. 31, 2017; 6 pages; Europe.
European Patent Office; PCT International Search Report, Issued in Connection to PCT/US2017/017398; 5 pages; Europe.
European Patent Office; PCT Written Opinion of the International Searching Authority, Issued in Connection to PCT/US2017/017398; 9 pages; Europe.
European Patent Office; Communicaiton and Search Report, Issued in Connection to EP15192642.5; Jun. 2, 2016; 7 pages; Europe.
European Patent Office; Communicaiton Pursuant to Rules 161(1) and 162 EPC, issued in connection to EP17706648.7; Sep. 19, 2018; 3 pages; Europe.
European Patent Office; Communicaiton Pursuant to Rules 161(1) and 162 EPC, issued in connection to EP16834162.6; Aug. 8, 2018; 3 pages; Europe.
European Patent Office; Communication Pursuant to Article 94(3) EPC, issued in connection to EP15192642.5: Mar. 13, 2019; 5 pages; Europe.

(56) References Cited

OTHER PUBLICATIONS

European Patent Office; Communication Pursuant to Article 94(3) EPC, Issued in Connection to EP047716499.1; May 9, 2016; 4 pages; Europe.
European Patent Office; Communication pursuant to Article 94(3) EPC, issued in connection to EP04716499.1; Mar. 10, 2017; 5 pages; Europe.
European Patent Office; Communication Pursuant to Article 94(3) EPC, Issued in Connection to EP04716499.1; Mar. 15, 2013; 4 pages; Europe.
European Patent Office; Summons to attend oral proceedings pursuant to Rule 115(1) EPC, issued in connection to EP04716499.1; Feb. 12, 2018; 6 pages; Europe.
European Patent Office; Extended European Search Report, issued in connection to EP18201370.6; Apr. 9, 2019; 6 pages; Europe.
European Patent Office; Extended European Search Report, issued in connection to EP15192642.5; Jun. 2, 2016; 6 pages; Europe.
European Patent Office; Communication Pursuant to Article 94(3) EPC, issued in connection to EP98934597.0; Mar. 16, 2009; 3 pages; Europe.
European Patent Office; Communication Pursuant to Article 94(3) EPC, issued in connection to EP98934597.0; Jun. 21, 2006; 4 pages; Europe.
European Patent Office; Communication Pursuant to Article 96(2) EPC, issued in connection to EP98934597.0; Sep. 10, 2004; 4 pages; Europe.
European Patent Office; Communication Pursuant to Article 96(2) EPC, issued in connection to EP98934597.0; Dec. 11, 2002; 3 pages; Europe.
European Patent Office; Communication Pursuant to Article 96(2) EPC, issued in connection to EP98934597.0; Oct. 8, 2001; 2 pages; Europe.
European Patent Office; Communication Pursuant to Article 96(2) EPC, issued in connection to EP05760680.8; Jan. 28, 2009; 6 pages; Europe.
European Patent Office; Communication Pursuant to Article 96(2) EPC, issued in connection to EP05760680.8; Jul. 5, 2010; 5 pages; Europe.
Espacenet; English Translation of CN203382593U; Oct. 4, 2016; 7 pages; Europe.
Espacenet; English Translation of CN202072546U; Oct. 4, 2016; 11 pages; Europe.
Espacenet; English Translation of FR2851559A1; Oct. 4, 2016; 9 pages; Europe.
Espacenet; English Translation of WO2010149908A1; Oct. 4, 2016; 23 pages; Europe.
The International Bureau OT WIPO; PCT International Preliminary Report on Patentability, Issued in Connection to PCT/2005/020712; Dec. 14, 2006; 5 pages; Switzerland.
The International Bureau OT WIPO; PCT International Preliminary Report on Patentability, Issued in Connection to PCT/2004/006366; Oct. 1, 2005; 5 pages; Switzerland.
Japanese Patent Office; Notice of Reasons for Rejection, issued in connection to JP2010-246536; Sep. 7, 2012; 8 pages; Japan.
Japan Patent Office; Notice of Reasons for Rejection, issued in connection with JP2010-246536; Nov. 12, 2013; 6 pages; Japan.
Japan Patent Office; Certified Copy of Final Rejection, issued in connection with JP2010-246536; Jun. 25, 2014; 2 pages; Japan.
Japan Patent Office; Decision to Dismiss Amendment, issued in connection to JP2010-246536; Jun. 25, 2014; 3 pages; Japan.
Japanese Patent Office; Notice of Reasons for Rejection of Japanese Patent Application 2016-017373; Dec. 7, 2016; 11 pages; Japan.
Japanese Patent Office; Certified Decision of Dismissal of Amendment, issued in connection to JP2014-217190; 4 pages; Japan.
Japanese Patent Office; Certified Final Rejection, issued in connection to JP2014-217190; 3 pages; Japan.
Japanese Patent Office; Notice of Reasons for Rejection, issued in connection to JP2014-217190; Aug. 31, 2016; 6 pages; Japan.
Japanese Patent Office; Notice of Reasons for Rejection, issued in connection to JP2014-217190; Sep. 30, 2015; 8 pages; Japan.
Japanese Patent Office; Observation, issued in connection to JP2017-226648; Jul. 17, 2018; 50 pages; Japan.
Japanese Patent Office; Notice of Reasons for Rejection, issued in connection to JP2017-226648; Jan. 31, 2019; 10 pages; Japan.
Japanese Patent Office; Notice of Resons for Rejection, issued in connection to JP2018-553847; May 29, 2019; 10 pages; Japan.
New Zealand Intellectual Property Office; First Examination Report, issued in connection to application No. 743895; Jan. 31, 2019; 5 pages; New Zealand.
New Zealand Intellectual Property Office; First Examination Report, issued in connection to application No. 743891; Nov. 6, 2018; 10 pages; New Zealand.
Behrens et al.; Performance of a Monolith-like Structured; Chem. Biochem. Eng. Q. 15 (2); pp. 49-57; 2001.
Beihai Huihuang Chemical Packing Co. Lts., http://77520.pub.diysite.com/sc.deliver/main/0-4-5/4/0-ma.html?siteid=77520; 10 pages; May 5, 2003.
BT-750 3/4 D Ceramic Wagon Wheel Unit; 1 page.
Butcher; Reticulated Ceramic Foam as a Catalyst Support; Seminar for CatCon '98; Jun. 3-5, 1998; Ohio.
Ceramic Industry Cover page; and Table of Contents; vol. 147, No. 3; 2 pages; Mar. 1997.
Christy Refractories Company; Prox-Svers Catalyst Support Media; 4/95.
Colombo; Porous Ceramics and Ceramic Components from Preceramic Polymers; http://www.matse.psu.edu/people/faculty/colombo.html; 5 pages.
Criterion; Top Bed Catalysts and Support; 1 page.
Criterion; Technical Bulletin: Loading Your Hydrotreating Reactor for Maximum Activity; Criterion Catalysts & Technologies; 3 pages; 2008.
Crystaphase Products, Inc.; Product Data Information: Ceramic Support—Recycled Silica Alumina; 1 page.
Fay; A Three-Point Generalization of the Ellipse; International Journal of Mathematical Education in Science and Technology; Jan. 2002; vol. 33, Issue 1; pp. 111-123.
Foseco Home Page; Internet; p. 1-3; Feb. 21, 1997.
Fulton; CE Refresher: Catalyst Engineering, Part 2, Selecting the Catalyst Configuration; May 1986' Chemical engineering; pp. 97-101.
Gibson; Cellular Solids, MRS Bulletin; www.mrs.org/publications/bulleting; pp. 270-274; Apr. 2003.
Gibson et al.; Cellular Solids: Structure and Properties; Second Edition, Cambridge Solid State Science Series, Cambridge University Press; 71 pages; 1997.
GKN Sinter Metals; Design Ideas and Application—Porous Discs; 4 pages.
Green et al.; Cellular Ceramics: Intriguing Structures, Novel Properties, and Innovative Applications; www.mrs.org/publications/bulletin; pp. 296-300; Apr. 2003.
Haldor Topsoe, Inc.; Material Safety Data Sheet Inert Topping TK-10; p. 1-4; 1992.
Haldor Topsoe; Topsoe Graded Bed Solutions; 3 pages.
Hickman et al.; Production of Syngas by Direct Catalytic Ocidation of Methane; Science; vol. 256; p. 343-346; Jan. 15, 1993.
Hi-Tech Ceramics; Reticel, Designing the Future with Advanced Reticulated Ceramics; Product Brochure; 6 pages.
Hung et al.; Translation of DE3539195, Hydroprocessing Catalyzer with Specific Geometric Shate; 23 pages; May 2000.
Ivars Peterson's MathLand; Beyond the Ellipse; The Mathematical Association of America; Sep. 2, 1996; 3 pages.
Kim et al.; Effect of Inert Filler Addition on Pore Size and Porosity of Closed-Cell Silicon Oxycarbide Foams; Journal of Materials Science 39; pp. 3513-3515; 2004.
Koch; Reactor Inerals by Koch, Your Way; 1 page.
Loehrke and Nagib, Agard Report No. R-598 Experiments on Management of Free-stream Turbulence 1972.
Materials 2017, 10(7), 735; "Improving the Strength of ZTA Foams with Different Strategies: Immersion Infiltration and Recoating;" https://doi.org/10.3390/ma10070735; 15 pages; Jul. 1, 2017.
Mills; Ceramic Technology Provides Refining Solutions, Saint-Gobain Norpro; pp. 1-17; 2003.
Mills; Ceramic Guard Bed Materials; Norton Chemical Process Products Corporation; Jun. 3-5, 1998; 24 pages; US.

(56) References Cited

OTHER PUBLICATIONS

Natural / Food Foams; 8 pages.
Norton Chemical Process Products Corporation, Macro Trap Guard Bed Media; 6 pages: 1998.
Norton Chemical Process Products COPR.; Denstone Inert Catalyst Bed Supports; 10 pages; 1992; Ohio.
NPRA Q&A Session on Refining and Petrochemical Technology; Section B. Hydrotreating; p. 85-101; 1990.
NPRA Q&A Session on Refining and Petrochemical Technology: Section B. Hydrotreating; p. 98-118; 1991.
NPRA Q&A Session on Refining and Petrochemical Technology: Section B. Hydrotreating; p. 104-135; 1992.
NPRA Q&A Session on Refining and Petrochemical Technology: Section B. Hydrotreating; p. 94-112; 1993.
NPRA Q&A Session on Refining and Petrochemical Technology: Section B. Hydrotreating; p. 98-139; 1994.
NPRA Q&A Session on Refining and Petrochemical Technology: Section B. Hydrotreating; p. 96-123; 1995.
NPRA Q&A Session on Refining and Petrochemical Technology: Section B. Hydrotreating; p. 131-160; 1996.
Olujic et al.; Distillation Column Internals/Configurations for Press . . . , Chem. Biochem, Eng. Q. 17 (4); pp. 301-309; 2003.
Perry's Chemical Engineers' Handbook, 7th Ed., McGraw-Hill, 1997, pp. 6-33-6-34.
Petro Ware, INCL; 86 Catalyst Support Media; Premium Quality from Beginning to End; 21 pages; Ohio.
Petrotech, vol. 4, pp. 382-383; 1981.
Product Bulletin: Criterion 855 MD "Medallions" Inert Catalyst Support; Aug. 1998; 2 pages.
Queheillalt et al.; Synthesis of Stochastic Open Cell Ni-Based Foams; Scripta Materialia 50; pp. 313-317; 2004.
Rashmi Narayan; Particle Capture from Non-Aqueous Media on Packed Beds; Dept. of Chemical and Materials Engineering; 116 pages; Fall 1996; Edmonton, Alberta.
Rauschert; Hiflow Rings Brochure; 5 pages.
Saxonburg Ceramics Incorporated; Product Material Specifications.
Woven Metal Products, Inc.; Perforated Plate; https://wovenmetal.com/reactor-internals/axialdownflow/catalyst-hold-downfloating-screens; printed Aug. 30, 2021; 2 pages.
Christy Catalytics; Catalyst Support Hold Down—Secondary Reformers; https://www.christycatalytics.com/our-blog/bid/31695/catalyst-support-hold-down-secondary-reformers; Dec. 3, 2009; 4 pages.
Crystaphase; CatTrap; https://crystaphase.com/solutions/cattrap/; Aug. 27, 2021; 3 pages.
Intellectual Property Office of Singapore; Examination Report, issued in connection with application No. 11201805491X; Sep. 28, 2021; 6 pages; Singapore.
Intellectual Property Corporation of Malaysia; Examination Adverse Report (Section 30(1) / 30(2)), issued in connection with application No. PI2018001178; Oct. 20, 2021; 4 pages; Malaysia.
Japanese Patent Office; Notice of Reasons for Rejection, issued in connection to Appeal Trial No. 2020-016134, application No. 2018-541647; Sep. 22, 2021; 14 pages; Japan.
Korean Intellectual Property Office; Notification of Provisional Rejection, issued in connection to application No. 10-2021-7019648; Sep. 19, 2021; 11 pages; Korea.
Japanese Patent Office; Statement of Submission of Publications, filed in connection to JP2020-194305; Oct. 6, 2021; 42 pages; Japan.
Kabe, Toshiaki; Hydrotreating—Science and Technology; Oct. 20, 2000; pp. 341-347; IPC KK.
Japanese Patent Office; Office Action, issued in connection to application No. 2020-110241; Jul. 21, 2021; 8 pages; Japan.
Japanese Patent Office; Final Rejection, issued in connection to application No. 2019-140168; Jul. 21, 2021; 7 pages; Japan.
Intellectual Property Corporation of Malaysia; Substantive Examination Adverse Report (Section 30(1) / 30(2), issued in connection with application No. PI2018702533; Apr. 27, 2021; 3 pages; Malaysia.
European Patent Office; Communication Pursuant to Article 94(3) EPC, issued in connection to application No. EP18201370.6; May 19, 2021; 4 pages; Europe.
European Patent Office; Communication Pursuant to Article 94(3) EPC, issued in connection to application No. EP17706648.7; Jul. 1, 2021; 7 pages; Europe.
Japanese Patent Office; Observation, issued in connection to JP2020-110241;May 28, 2021; 36 pages; Japan.
Petrotech, vol. 4, p. No. 4; pp. 295-394; Apr. 1981.
Korean Intellectual Property Office; Second Notificaiton of Provisional Rejection, issued in connection to application No. 10-2018-7021988; Oct. 26, 2020; 12 pages; Korea.
Japanese Patent Office; Final Office Action, issued in connection to application No. 2018-553847; Jan. 6, 2021; 11 pages; Japan.
Canadian Patent Office; Office Action, issued in connection to application No. 3009825; Feb. 17, 2021; 3 pages; Canada.
Korean Intellectual Property Office; Notice of First Refusal Ruling, issued in connection to application No. 10-2018-7021988; Mar. 26, 2021; 8 pages; Korea.
Brazilian National Institute of Industrial Property; Technical Examination Report, issued in connection to PI0613275-8 ; Feb. 24, 2021; 18 pages; Brazil.
Japanese Patent Office; Final Office Action, issued in connection to application No. 2017-226648; Feb. 24, 2021; 29 pages; Japan.
Nippon Ketjen CO., LTD; Summary of Invalidation Reason, filed in connection to Korean patetn No. 10-1417049; Mar. 15, 2021; 35 pages; Korea.
Korean Intellectual Property Office; Notificaiton of Reason for Refusal, issued in connection to application No. 10-2021-7015042; Aug. 27, 2021; 7 pages; Korea.
European Patent Office; International Search Report, issued in connection to application No. PCT/US2021/049704; Nov. 26, 2021; 4 pages; Europe.
European Patent Office; Written Opinion of the International Searching Authority, issued in connection to application No. PCT/US2021/049704; Nov. 26, 2021; 7 pages; Europe.
Intellectual Property Office of Singapore, Written Opinion, issued in connection to application No. 10202007685S; Jul. 17, 2022; 8 pages; Singapore.
European Patent Office; Communication Pursuant to Rules 161(1) and 162 EPC, issued in connection to application No. EP21794038.6; 3 pages; Apr. 18, 2023; Europe.
European Patent Office; Communication Pursuant to Article 94(3) EPC, issued in connection to EP18201370.6; 4 pages; Jun. 17, 2022; Europe.
Japanese Patent Office; Final Rejection, issued in connection to application No. 2020-110241; Jun. 8, 2022; 6 pages; Japan.
Ancheyta, Jorge et al.; Asphaltenes: Chemical Transformation during Hydroprocessing of Heavy Oils; Chemical Industries/124; CRC Press; 2009; 5 pages.
Third Party Submission; filed in connection to application No. 2020-110241; May 18, 2022; 39 pages; Japan.
Japanese Patent Office; Office Action, issued in connection to application No. 2021-116861; Aug. 24, 2022; 10 pages; Japan.
Mexican Patent Office; Office Action, issued in connection to application No. MX/a/2018/007939; Mar. 21, 2023; 6 pages; Mexico.
Intellectual Property Office of Singapore; Refusal of Request for Examinaton Review Report, issued in connection with application No. 11201805491X; May 11, 2023; 8 pages; Singapore.
Intellectual Property Office of Singapore; Notice of Intention to Refuse Patent Application, issued in connection with application No. 11201805491X; Sep. 28, 2021; 6 pages; Singapore.
Japanese Patent Office; Office Action, issued in connection to application No. 2020-194305; Oct. 19, 2022; 13 pages; Japan.
Japanese Patent Office; Office Action, issued in connection to application No. 2020-194305; Jan. 19, 2022; 4 pages; Japan.
European Patent Office; Summons to attend oral proceedings pursuant to Rule 115(1) EPC, issued in connection to application No. 15192642.5; Jun. 7, 2024; 6 pages; Europe.
European Patent Offiec; Communication pursuant to Article 94(3) EPC, issued in connection to patent application No. 17706648.7; Jan. 29, 2025; 5 pages; Europe.

(56) References Cited

OTHER PUBLICATIONS

Japan Patent Office; Office Action, issued in connection to 2020-194305; Jan. 15, 2025; 15 pages; Japan.
Japan Patent Office; Office Action, issued in connection to patent application No. 2023-184513; Jan. 29, 2025; 4 pages; Japan.
Korean Intellectual Property Office; Notice of Final Refusal Ruling, issued in connection with application No. 10-2021-7015042; Jul. 23, 2024; 5 pages; Republic of Korea.
Canadian Intellectual Property Office; Office Action, issued in connection to application No. 3,192,003; May 2, 2024; 4 pages; Canada.
European Patent Office; Communication pursuant to Article 94(3) EPC, issued in connection to application No. 18201370.6; Feb. 8, 2023; 4 pages; Europe.
Mexican Patent Office; Office Action, issued in connection to application No. MX/a/2018/007939; Aug. 15, 2023; 6 pages; Mexico.
Mexican Patent Office; Office Action, issued in connection to application No. MX/a/2018/007939; Jan. 3, 2024; 7 pages; Mexico.
Intellectual Property Office of Singapore; Invitation to Respond to Written Opinion with Search Report, issued in connection with application No. 10202113738Q; Sep. 18, 2023; 11 pages; Singapore.
Intellectual Property Office of Singapore; Notice of Intention to Refuse Patent Application, issued in connection with application No. 10202113738Q; Feb. 20, 2024; 8 pages; Singapore.
Japanese Patent Office; Certified Final Rejection, issued in connection to application No. 2020-194305; Jun. 28, 2023; 5 pages; Japan.
Korean Intellectual Property Office; Notification of Provisional Rejection, issued in connection to application No. 10-2021-7015042; Aug. 31, 2022; 5 pages; Korea.
Mexican Patent Office; Office Action, issued in connection to application No. MX/a/2018/008258; Sep. 5, 2023; 6 pages; Mexico.
Mexican Patent Office; Office Action, issued in connection to application No. MX/a/2018/008258; Jan. 12, 2024; 7 pages; Mexico.
Intellectual Property Office of Singapore; Invitation to Respond to Written Opinion, issued in connection with application No. 10202007685S; Mar. 4, 2024; 7 pages; Singapore.
Mexican Institute of Industrial Property; Office Action, issued in connection to application No. MX/a/2018/007939; May 13, 2024; 5 pages; Mexico.
Mexican Institute of Industrial Property; Office Action, issued in connection to application No. MX/a/2018/008258; May 20, 2024; 7 pages; Mexico.
Intellectual Property Office of Singapore; Invitation to Respond to Written Opinion, issued in connection with application No. 10202301970T; Sep. 5, 2024; 6 pages; Singapore.
Japanese Patent Office; Office Action, issued in connection to application No. JP2023-515777; Jul. 31, 2024; 6 pages; Japan.
European Patent Office; Decision to Refuse a European Patent Application, issued in connection to application No. 15192642.5; Jan. 16, 2025; 10 pages; Europe.
Intellectual Property Office of Singapore; Notice of Intention to Refuse Patent Application, issued in connection with application No. 10202007685S; Nov. 8, 2024; 8 pages; Singapore.
Japanese Patent Office; Notice of Reasons for Rejection, issued in connection to application No. 2023-112045; Oct. 2, 2024; 4 pages; Japan.
Mexican Institute of Industrial Property; Office Action, issued in connection to application No. MX/a/2018/008258; Oct. 14, 2024; 7 pages; Mexico.
European Patent Office; Extended European Search Report, issued in connection to patent application No. 24196803.1; Jun. 10, 2025; 11 pages; Europe.
Intellectual Property Office of India; Examination Report, issued in connection to patent application No. 202337025702; May 15, 2025; 8 pages; India.
Intellectual Property Office of Singapore; Invitation to Respond to Written Opinion, issued in connection to application No. 11202301766S; Jan. 10, 2026; 8 pages; Singapore.
Intellectual Property Office of Singapore; Refusal of Request for Examination Review Report, issued in connection to application No. 10202113738Q; Oct. 8, 2025; 8 pages; Singapore.
Japanese Patent Office; Final Rejection, issued in connection to application No. JP2023-515777; Apr. 30, 2025; 7 pages; Japan.
Japanese Patent Office; Notice of Reasons for Rejection, issued in connection to application No. 2023-112045; Jul. 30, 2025; 7 pages; Japan.
Korean Intellectual Property Office; Notification of Provisional Rejection, issued in connection to application No. 10-2023-7008381; Jun. 19, 2025; 23 pages; Korea.

* cited by examiner

Prior Art

STRUCTURED ELEMENTS AND METHODS OF USE

RELATED APPLICATIONS

This application is a continuation application and claims the benefit, and priority benefit, of U.S. patent application Ser. No. 15/393,573, filed Dec. 29, 2016, which claims the benefit, and priority benefit, of U.S. Provisional Patent Application Ser. No. 62/273,590, filed Dec. 31, 2015, and U.S. Provisional Patent Application Ser. No. 62/294,718, filed Feb. 12, 2016, the contents of each are incorporated by reference herein in their entirety.

BACKGROUND

1. Field of the Invention

The presently disclosed subject matter relates to materials and methods for enhanced treatment of streams to, from and/or within process units.

2. Description of the Related Art

It is known in the art to tailor various streams flowing to, from and/or within process units in industrial facilities in order to to improve the efficiency and economics of the process units contained in the facilities. For example, undesired species in streams can foul, clog, contaminate, poison or degrade unit internals. These undesired species can also have negative effects on the performance of units contiguous to, downstream of, or integrated with such units. Additionally, process unit performance depends on the effective division and distribution of streams entering and within the process unit in order to facilitate optimum contact with internals within the process unit. Improvements in this field of technology are desired.

SUMMARY

The presently disclosed subject matter relates to materials and methods for enhanced treatment of streams to, from and/or within process units.

In certain illustrative embodiments, a method of flow division and distribution and of filtration and mitigation of undesired species from a stream to a unit is provided. The stream can be passed through and contacted with the surfaces of structured elements disposed in the unit, the structured elements being present in an amount sufficient to facilitate flow division and distribution of the stream and to mitigate the undesired species in the stream. The structured elements can have a contact surface with a surface area ranging from 200 to 800,000 square meters per cubic meter of structured elements. The structured elements can also have a filtration capability able to effectively remove particulates of sizes from 100 nanometers to 11 millimeters.

In certain aspects, the structured elements can have a contact surface with a surface area of at least 10,000 square meters per cubic meter of structured elements. The structured elements can also have a contact surface with a surface area of up to 800,000 square meters per cubic meter of structured elements. The structured elements can also have a contact surface with a surface area ranging from 10,000 to 800,000 square meters per cubic meter of structured elements.

In certain aspects, the structured elements can comprise one or more interconnected unit cells, each unit cell having a frame and a plurality of faces. The individual faces can be open, partially open or entirely closed. The frame and plurality of faces of each unit cell can form a three dimensional structure. The three dimensional structure can be a polyhedron, exemplified by the Weaire-Phelan foam-like structure. The polyhedron can be a regular polyhedron or an irregular polyhedron. The three dimensional structure can be a monolith. The monolith can have parallel and non-intersecting channels. The monolith can have irregular, non-intersecting channels. At least 10% of the total area of the faces of the unit cells can be partially or totally obstructed. The unit cells can each have a diameter in the range from 0.5 to 50 millimeters. The structured element can have a plurality of interconnected unit cells comprising a plurality of tortuous flow passageways through the structured element and the stream can be passed through and contacted with the surfaces of the plurality of tortuous flow passageways.

In certain aspects, the structured element can additionally include a plurality of asperities formed on the unit cells comprising the structured element. The asperities can include one or more of channels, flutes, spikes, fibrils and filaments. The contact surface of the structured element can comprise the surfaces of the plurality of tortuous passageways as well as the interconnected unit cells including their frames, their faces and their asperities.

In certain illustrative embodiments, a method of mitigation of undesired species from a stream to a process unit is provided. The stream can be passed through one or more structured elements in the unit, the structured elements being present in an amount sufficient to mitigate the undesired species in the stream. The stream can be contacted with the surfaces of the structured elements to mitigate the undesired species in the stream. The structured elements can have a contact surface with a surface area ranging from 200 to 800,000 square meters per cubic meter of structured elements and a filtration capability able to effectively remove particulates of sizes from 100 nanometers to 11 millimeters. In certain aspects, the structured elements can also have a contact surface with a surface area of at least 10,000 square meters per cubic meter of structured elements. The structured elements can also have a contact surface with a surface area of up to 800,000 square meters per cubic meter of structured elements. The structured elements can also have a contact surface with a surface area ranging from 10,000 to 800,000 square meters per cubic meter of structured elements.

In certain illustrative embodiments, a method of facilitating flow division and distribution of a stream to a process unit is provided. The stream can be passed through structured elements in the unit, the structured elements being present in an amount sufficient to facilitate flow division and distribution of the stream. The stream can be contacted with the structured elements to facilitate flow division and distribution of the stream. The structured elements can have a contact surface with a surface area ranging from 200 to 800,000 square meters per cubic meter of structured elements and a filtration capability able to effectively remove particulates of sizes from 100 nanometers to 11 millimeters. In certain aspects, the structured elements can also have a contact surface with a surface area of at least 10,000 square meters per cubic meter of structured elements. The structured elements can also have a contact surface with a surface area of up to 800,000 square meters per cubic meter of structured elements. The structured elements can also have a contact surface with a surface area ranging from 10,000 to 800,000 square meters per cubic meter of structured elements.

Figure 1:
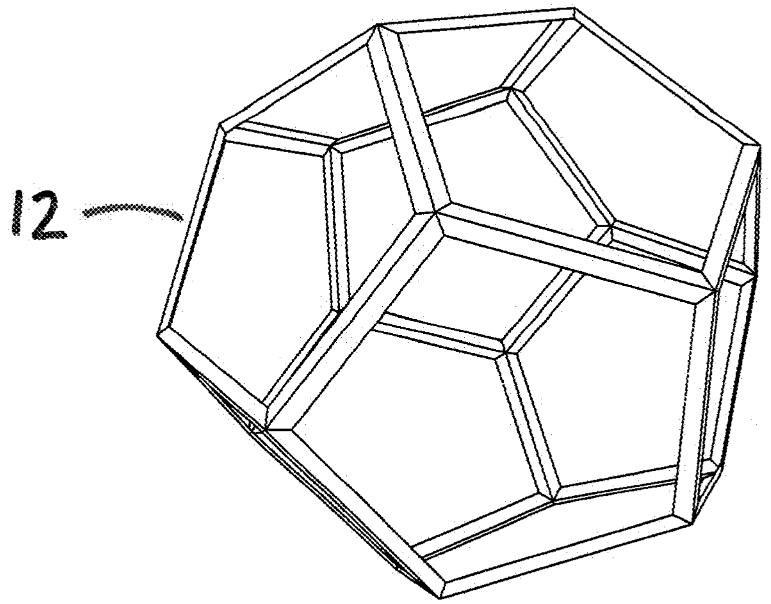
FIG. 1 is a perspective view of a unit cell for a structured element, the unit cell having a dodecahedron shape, in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to materials and methods for enhanced treatment of streams to, from and/or within process units. Units typically have internals to tailor streams entering and/or within the unit. Units also have internals to undertake desired unit operations, such as, for example, catalytic reactions and/or mass transfer. Stream treatment functions can include attracting, retaining and/or otherwise mitigating undesired species and/or ensuring effective stream flow division and distribution. The undesired species can include, without limitation, solid particulates, molecular species and entrained fluids.

Units can have streams entering the units as feeds, internal streams (such as recycle streams) within the units and streams exiting the units as products. The handling of these streams can involve a variety of activities including but not limited to (i) mitigating undesired species, (ii) ensuring effective stream flow division and distribution, (iii) performing desired unit operations such as chemical reactions and mass transfer including component separation, and (iv) generating and recovering streams as finished products or as feeds to other units. These activities can be carried out in discrete zones within units or combined as appropriate.

As an example of a simple configuration frequently utilized in industry, many units have a stream treating zone positioned upstream of a stream processing zone, both contained within the same unit. In such a configuration and in the majority of configurations utilized in industry, the roles of the treating zone are to provide to the processing zone a stream whose flow is effectively divided and distributed and/or that is substantially free of undesired species. However, many other configurations of these functionalities and combinations of these functionalities may be designed into units.

In some cases, treating zones can be installed for the sole purpose of dividing and distributing stream flow, or for the sole purpose of mitigating undesired species. Treating zones can be composed of separate layers of materials specifically designed to accomplish these purposes. For example, layers of different forms of media (including different sizes or shapes or structures or compositions or the like) can be installed with each layer targeted at mitigating a specific set of undesired species. Layers can be composed of media whose purposes are to both mitigate undesired species and facilitate stream division and distribution. Layers may be installed in any order and in any location as dictated by the functions to be performed. Units may have only one treating zone or one processing zone, one of each, one of each and multiples of the other, multiples of both or combinations of both. Combination is meant to include zones which have both treating and processing functionalities.

Treating zones can have useful lives primarily dictated by their capacity to attract, retain and/or otherwise mitigate undesired species and/or their ability to effectively divide and distribute the flow of streams passed through them. Treating zones can become blocked or clogged over time and eventually exhaust their capacities to attract, retain, and mitigate undesired species and/or divide and distribute the flow of streams. As these capacities are exhausted, insufficiently-processed streams can progress into downstream zones. Treating zone exhaustion can result in increased pressure drop in the unit itself which can necessitate unit shutdown to rejuvenate (via, for examples, regeneration or partial or complete replacement) the contents of the treating zone and, perhaps, the contents of downstream zones.

A function of processing zones is to process the suitably tailored streams exiting the treating zones. Examples of such processing include (i) molecular conversion via thermal, pressure and/or catalytic means and (ii) component separation via distillation, extraction or the like. Some materials and media used in such processing zones can have a useful "on-oil" life. In process units, for example, where the media in the processing zone are catalysts, the capability of the catalytic media can degrade over time due to catalyst deactivation caused, for examples, by coking or by agglomeration or conversion of catalytic species. A typical response to processing zone catalyst deactivation is to increase unit temperature in order to sustain catalytic performance. Maximum allowed temperature, when reached, will require unit shutdown. Improved treatment zones can facilitate enhanced performance of catalytic processing zones by: [i] prolonging catalyst life via providing stream flows that are more dispersed and distributed, [ii] prolonging catalyst life via providing stream flows containing reduced concentrations of undesired species, and [iii] advantageously allowing the use of more productive catalyst media, i.e., more active media or more long-lasting media.

Various conventional means exist for attracting, retaining and/or otherwise mitigating undesired species in streams passing through treating zones. For example, absorbents or otherwise active materials can be used to render undesired chemical species inert, cause them to be ejected from the unit in an effluent stream or converted into larger particulate matter that can be effectively removed using traditional filtration solutions. Undesired chemical species including reaction products such as iron sulfides and the like can form small particulates. Existing filtration technologies have limitations regarding the particulate sizes they can remove and have limited abilities to deal with undesired chemical species.

Conventional filtration media are also utilized in treating zones within units. However, these media can become clogged and blocked, which causes increases in pressure drop across the filter system as well as the unit itself which may require that the entire unit be taken off-line to remove and replace spent filter media and systems.

Filter system backwashing has also been used to remove filtered particulates. These change-outs and/or cleanings require costly interruptions with accompanying costs due to unit downtime, filter system expenses and maintenance effort. Such change-outs and/or cleanings also incur operating risks associated with unit shutdowns, startups and maintenance.

Porous filtration media have been utilized to attract and retain undesired species found in streams. Conventional porous filtration media are typically composed of ceramics or metals capable of withstanding the severe operating conditions in industrial units. The primary filtration mechanism of such media has been thought to occur within the pores of the media. The ability of such media to effectively mitigate such species has hitherto been correlated with pore size distribution, typically measured by "ppi" or "pores per inch." Conventional porous filtration media can be commercially manufactured with ppi ranging from about 10 to 100. The ability of such media to attract and retain undesired species depends not only on its ppi but also on the internal surface area of the media. For example, 10 ppi conventional porous media has internal surface area of about 300 square meters per cubic meter of media and has the ability to attract and retain undesired species sized from about 650 to 2000 microns. A 100 ppi conventional porous media has internal surface area of about 2400 square meters per cubic meter of media and has the ability to attract and retain undesired species sized from about 40 to 500 microns. Mitigating undesired species with sizes below 40 microns is not commercially feasible with conventional media. Also, mitigating undesired species ranging in size from, say, 40 to 2000 microns would require utilization of multiple grades of conventional media, each with its own ppi structure and associated internal surface area. Attempts to mitigate species larger than the capable maximum (2000 microns for 10 ppi media and 500 microns for 100 ppi media) results in complete performance debilitation of conventional media.

Porous media is frequently used in treating zones of units to achieve flow division and distribution to downstream processing zones in the same units. The prevailing thinking regarding this subject has been that treating zone flow division and distribution is enhanced as decreased pore size provides increased division and distribution capability. The presently disclosed subject matter demonstrates that the amount and structure of the contact surface area of treating zone media determines the efficacy of stream flow division and distribution as well as undesired species mitigation.

Providing optimum stream treatment systems requires the proper selection, design, fabrication, installation, operation and maintenance of such systems. Key performance parameters to be considered include the robustness of the materials selected to attract, retain and/or otherwise mitigate undesired species and/or the configuration and assembly of such materials so as to provide effective stream division and distribution.

Processing zones can be located within the same unit as the treating zone or in a vessel downstream of the vessel containing the treating zone. Zones within units are utilized to treat and/or process streams. Some zones simultaneously treat and process streams. More typically, streams passing through treating zones are subsequently passed to processing zones.

In certain illustrative embodiments, the presently disclosed subject matter can be employed in zones that simultaneously treat and process streams or in stand-alone treating zones. Specifically, the presently disclosed subject matter can: (i) more fully utilize the capability of the unit internals to attract, retain and/or otherwise mitigate undesired species; (ii) more effectively divide and distribute streams to processing zones within units; (iii) reduce the costs of such treating zone solutions while also allowing for maximized utilization of capabilities of the processing zones of such units; and (iv) result in substantial increases in unit profitability.

In certain illustrative embodiments, the presently disclosed subject matter comprises structured elements with capabilities for stream flow division and distribution and mitigation of undesired species that exceed those of conventionally available materials. When used in units, the structured elements described herein have a number of advantages when compared to prior art materials. For treating zones within units, the advantages include: (i) reducing the depth of the treating zone required, (ii) attracting, retaining and/or otherwise mitigating undesired species unable to be handled by prior art materials and (iii) providing flow division and distribution to processing zones more effectively than prior art materials. For processing zones, the advantages include: (i) having the benefit of cleaner, better divided and/or distributed streams exiting from treating zones, (ii) allowing the utilization of more effective processing zone internals, e.g., more active catalyst types or morphologies, and (iii) creating additional processing zone space to increase loadings of catalysts, absorbents or other internals. For the unit as a whole, the advantages include: (i) reducing the need for unit disruptions, including downtimes, with attendant loss of unit productivity, (ii) reduced operating risks associated with such disruptions and (iii) increased unit reliability and profitability.

Conventional filtration systems in treating zones using porous media have been pore-centric with filtration thought to occur within the pores of the filter media. Recent studies have revealed that the primary filtration mechanism in such media is attraction, retention and/or otherwise mitigation of undesired species on the contact surfaces within the media. In certain illustrative embodiments, the presently disclosed subject matter comprises structured elements having contact surface architecture that is superior to that found in conventional filter media. The contact surface architecture is more amenable to attracting, retaining and/or otherwise mitigating undesired species and/or to facilitating stream flow division and distribution.

In certain illustrative embodiments, the structured elements have multifaceted, three-dimensional geometry with significantly increased contact surface area relative to conventional material architecture. Structured elements can comprise interconnected unit cells, each unit cell having a frame and a plurality of faces. The individual faces can be open, partially open or closed. At least 10% of the total area of the faces of the unit cells can be closed. The structured elements can additionally include a plurality of asperities formed on the unit cells. Asperities can include one or more of channels, flutes, spikes, fibrils and filaments. The structured elements can have a plurality of tortuous passageways through the structure via the openings in the faces of the interconnected unit cells.

Representative three dimensional architectures of the structured element unit cells can include regular and irregular polyhedra and monoliths.

The contact surface of the structured elements can comprise the surfaces of both their tortuous passageways and their unit cells including the frames, faces and asperities of the unit cells. The contact surface of the materials of the presently disclosed subject matter exceeds that of prior materials.

These contact surfaces provide the primary vehicle for mitigating undesired species via attraction, retention, adhesion, absorption, coalescence, agglomeration, capillary action and the like. This results in increased mitigation of undesired species within treating zones which leads directly to improved unit performance.

In certain illustrative embodiments, the structured elements have tortuosity and boundary layer conditions which enhance the ability of the material to attract, retain and/or otherwise mitigate particulate and molecular species. For example, in certain illustrative embodiments, the presently disclosed materials can attract and retain species having sizes as small as 200 nanometers, and in certain illustrative embodiments, as small as 100 nanometers.

In certain illustrative embodiments, the structured elements can be engineered to have structural characteristics beyond the geometric bounds set by the natural formations of foams, gels and extrusions which are used to form conventional porous media. The structured elements can have "active" surface features that improve attraction, retention and/or other mitigation capabilities and enhance flow division and distribution.

For example, in certain illustrative embodiments, the active surface features can include: (i) engineered blockage or partial blockage of unit cell faces; (ii) designed roughness of surfaces plus designed surface asperities or irregularities such as channels, flutes, spikes, fibrils, filaments and the like; (iii) increased tortuous surfaces and surface area of passageways; (iv) regions allowing pooling and settling of liquids; and (v) increased laminar flow and boundary layer zones, wherein van der Waals adhesion forces are magnified.

Active surface features of pooling and settling regions include enhanced capture of small particles which, according to Stokes Law, require more time to pool and settle than larger particles.

Furthermore, it is known that van der Waals adhesion forces become dominant for collections of very small particles (i.e. 250 microns or smaller). Van der Waals adhesion forces are dependent on surface topography, and if there are surface asperities or protuberances which result in greater area of contact between particles or a particle and a wall, van der Waals forces of attraction as well as the tendency for mechanical interlocking increase.

In certain illustrative embodiments, the structured elements have an engineered architecture that elicits enhanced performance beyond existing porous or cellular materials due to improved surface architecture and conditions. The structured elements can have an enlarged contact surface area containing thin film boundary layers within which molecular attraction and retention plus Van der Waals adhesion forces are magnified.

In certain illustrative embodiments, surface features of the structured elements can include surfaces that are wholly or partially composed of, or coated with, materials that enhance mitigation of undesired species. An illustrative example is wash coating with a material which helps attract and retain metal molecular species such as arsenic and vanadium, both of which are powerful catalyst deactivators or poisons.

The structured elements provide increased opportunities for surface attraction, retention and coalescence of undesired species. In certain illustrative embodiments, the functional contact surfaces of the structured elements can include one or more of: (i) the faces of cells, (ii) the surfaces of struts connecting cells, (iii) the surfaces of nodes connecting struts, and (iv) the surfaces of asperities or irregularities caused by channels, flutes, spikes, fibrils or filaments in or on the surfaces of all the above. The functional contact surfaces of the structured elements can be manufactured or modified to enhance coalescence, chemical reaction, agglomeration of atoms into larger species, extraction, adsorption, and the like in the process units.

In certain illustrative embodiments, the structured elements can facilitate flow division and distribution in units. It has been learned that flow division and distribution enhancement can be attributed not only to tortuous mixing, but also, in certain illustrative embodiments, to the development of thin films on the surfaces of the structured elements. These films and surfaces can provide a vehicle for division and flow distribution. Thus, the focus of flow division and distribution performance is shifted from pore size and pore volume to contact surfaces, surface area and, importantly, surface asperities and irregularities.

In certain illustrative embodiments, the structured elements can have appropriately engineered architectures that attract, retain and/or otherwise mitigate a broader range of undesired species than conventional materials. This provides the important economic benefit of decreasing the number of layers of media "grades" (and the space required to contain them) in a unit's treating zone(s) and freeing valuable space for added unit internals (such as catalyst) in the unit's processing zone(s). In certain illustrative embodiments, the structured elements comprise materials having an internal void fraction of 60% or greater. In certain illustrative embodiments, the structured elements can begin with cells that are 0.5 to 50 millimeters in size.

In certain illustrative embodiments, the structured elements can comprise polyhedral shaped materials. The polyhedral shapes can include, for example, tetrahedra, cubes, octahedra, dodacahedra and isosahedra. The polyhedral shapes can be formed from a plurality of interconnected unit cells comprising polygonal shaped materials that are positioned together to form a combined structure. Further, the structured elements can comprise reticulated ceramics as well as any other cellular ceramics including monolithic structures.

Figure 2:
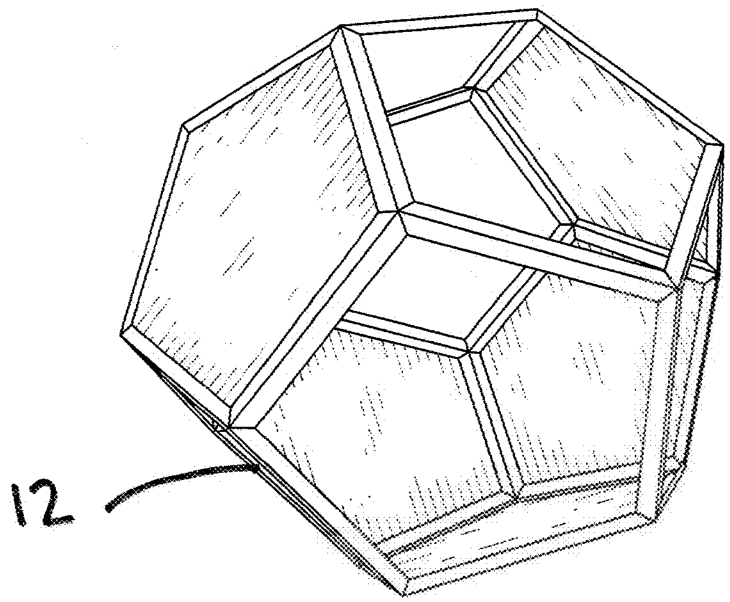
FIG. 2 is a perspective view of a unit cell for a structured element, the unit cell having a dodecahedron shape with a plurality of blocked openings in accordance with an illustrative embodiment of the presently disclosed subject matter.
Figure 3:
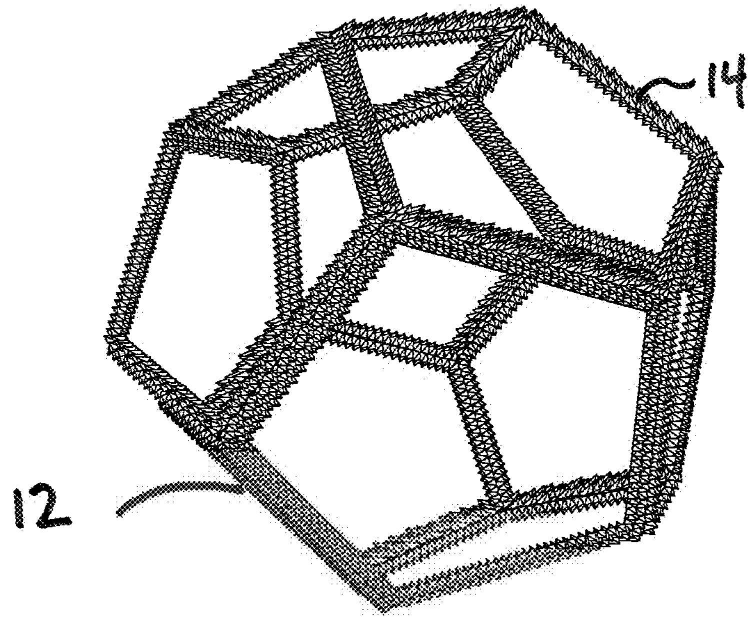
FIG. 3 is a perspective view of a unit cell for a structured element, the unit cell having a dodecahedron shape with a surface roughened by asperities and irregularities in accordance with an illustrative embodiment of the presently disclosed subject matter.
Figure 4:
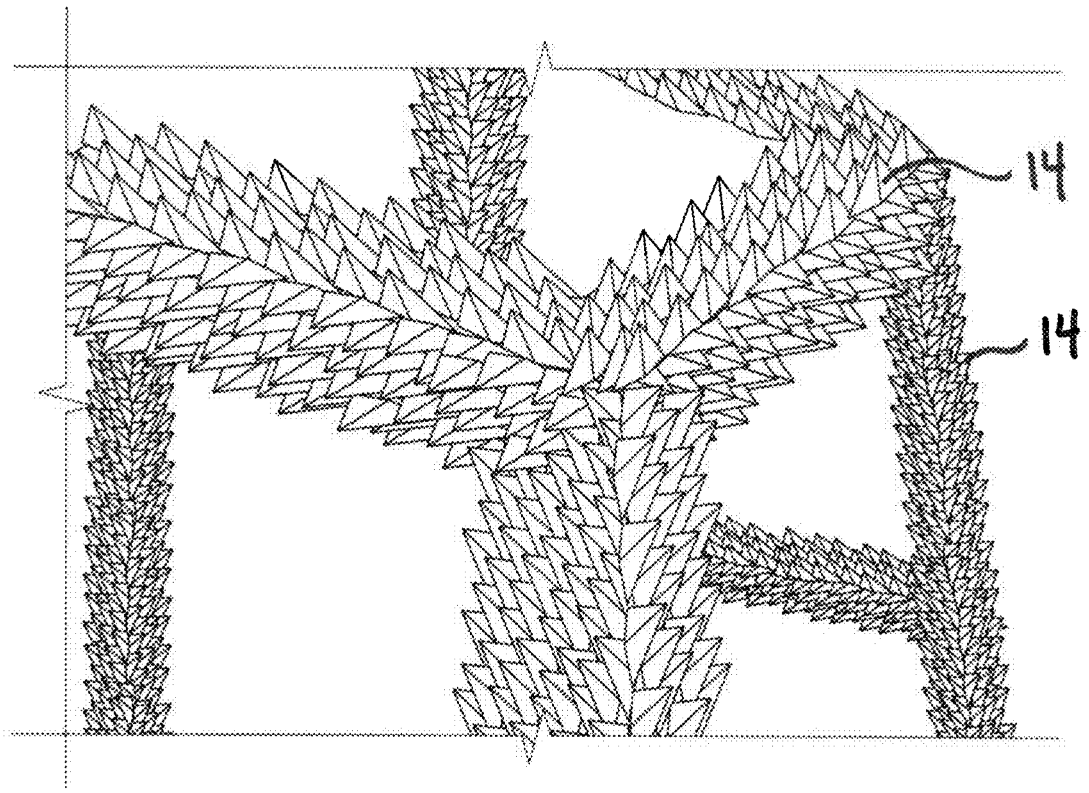
FIG. 4 is a zoomed-in perspective view of the unit cell of FIG. 3.
Figure 5:
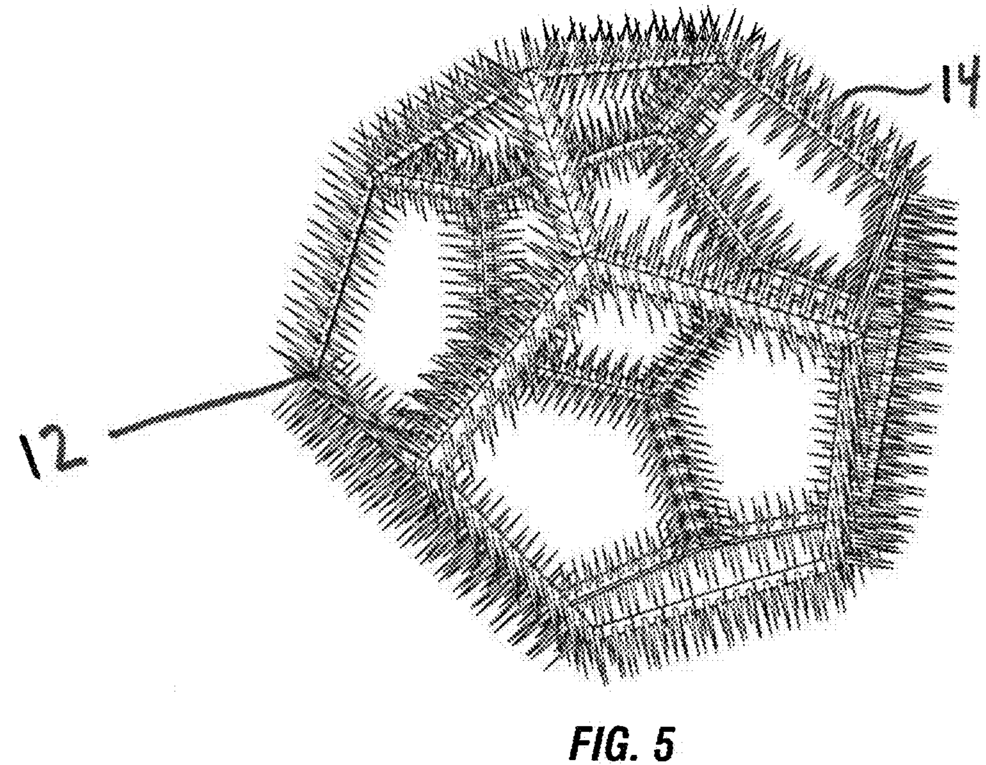
FIG. 5 is a perspective view of a unit cell for a structured element, the unit cell having a dodecahedron shape with a strutted or fibrillar surface in accordance with an illustrative embodiment of the presently disclosed subject matter.
Figure 6:
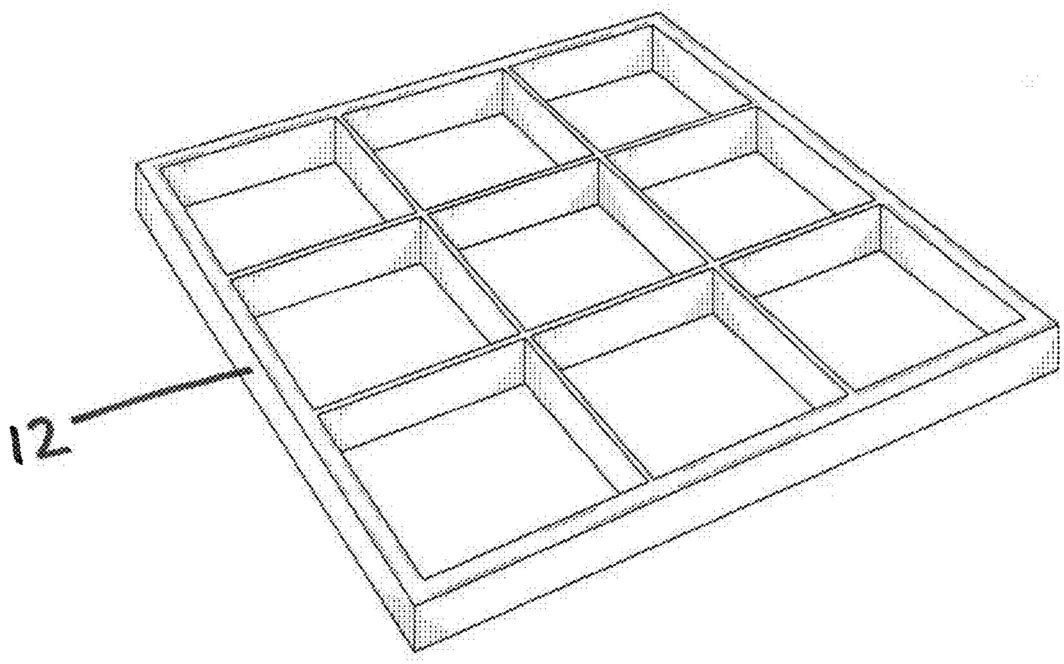
FIG. 6 is a perspective view of a structured element comprised of unit cells and having a monolithic shape in accordance with an illustrative embodiment of the presently disclosed subject matter.
Figure 7:
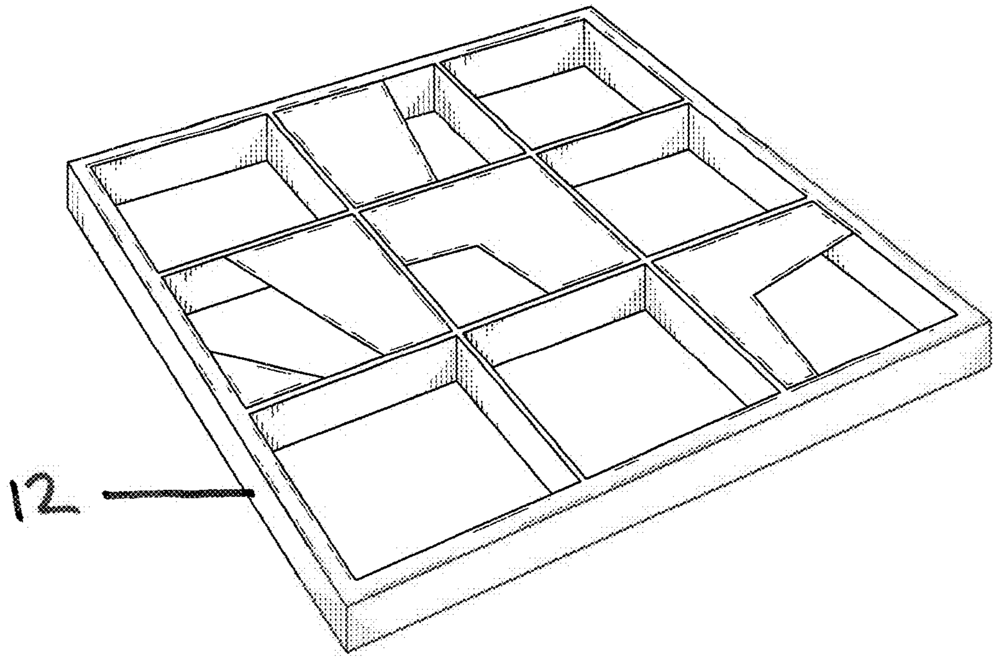
FIG. 7 is a perspective view of a structured element comprised of unit cells and having a monolithic shape and a plurality of blocked openings in accordance with an illustrative embodiment of the presently disclosed subject matter.
Figure 8:
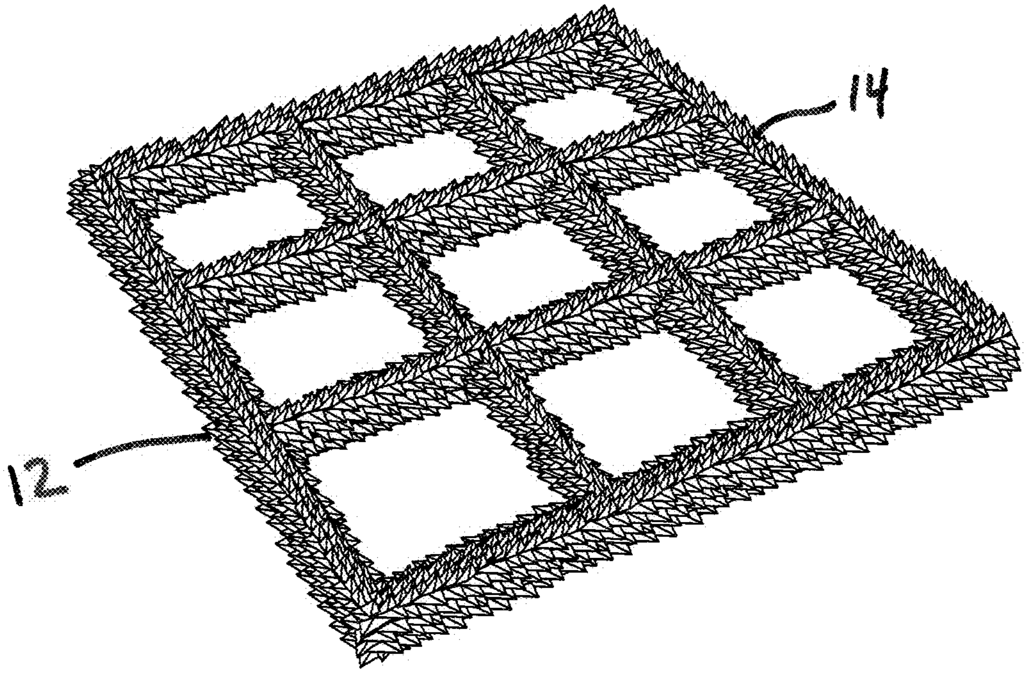
FIG. 8 is a perspective view of a structured element comprised of unit cells and having a monolithic shape with a roughened surface in accordance with an illustrative embodiment of the presently disclosed subject matter.
Figure 9:
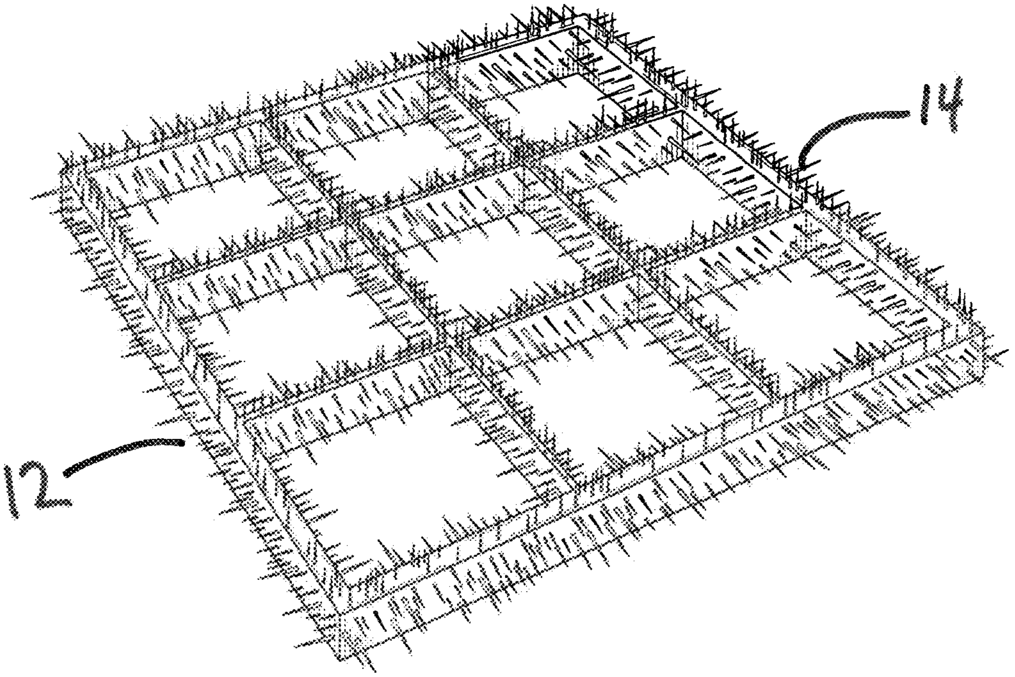
FIG. 9 is a perspective view of a structured element comprised of unit cells and having a monolithic shape with a strutted or fibrillar surface in accordance with an illustrative embodiment of the presently disclosed subject matter.
Figure 12A:
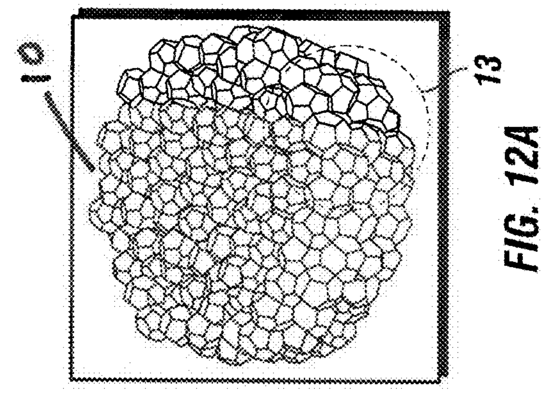
FIGS. 12A-D are images of the presently disclosed structured elements having various sized openings in accordance with illustrative embodiments of the presently disclosed subject matter.
Figure 12B:
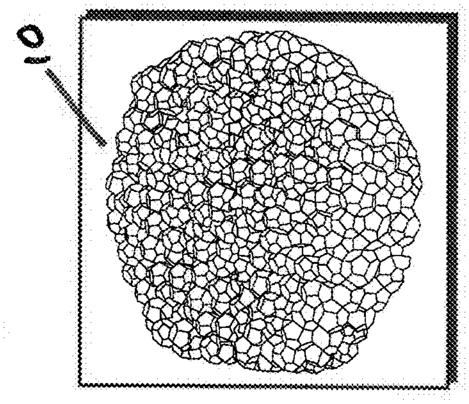
Figure 12C:
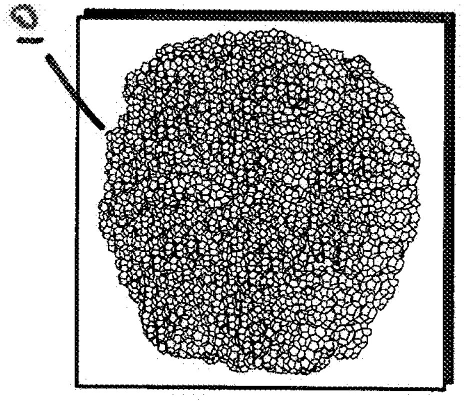
Figure 12D:
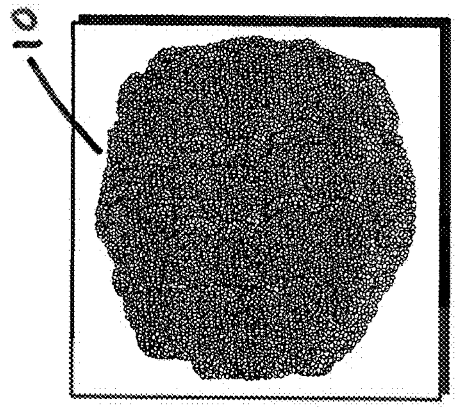

Various illustrative embodiments of the structured element unit cells are shown in FIGS. 1-5. FIG. 1 shows a standard dodecahedron-shaped unit cell, which can be for example, the building block for a reticulated ceramic. FIG. 2 shows the dodecahedron-shaped unit cell having approximately 50% blocked openings. FIG. 3 shows the dodecahedron-shaped unit cell having a roughened surface. FIG. 4 shows a close up view of the dodecahedron-shaped unit cell of FIG. 3, to further illustrate the roughened surface. FIG. 5 shows the dodecahedron-shaped unit cell having a fibrillar surface. FIGS. 12A-12D are representative views of the structured elements composed of a plurality of unit cells wherein the unit cells have different sizes (measured in pores per inch). FIG. 12E, a zoomed portion of FIG. 12A, illustrates the surface features of the structured elements that produce the significant increase in contact surface area relative to conventional materials, in certain illustrative embodiments. FIG. 6 shows a structured element having a standard monolithic structure. FIG. 7 shows the monolithic structure having approximately 50% blocked openings. FIG. 8 shows the monolithic structure having a roughened surface. FIG. 9 shows the monolithic structure having a spiked or fibrillar surface.

In certain illustrative embodiments, the structured elements comprise materials having a geometric contact surface area in the range from 200 to 800,000 square meters per cubic meter of said structured elements. In certain aspects, the structured elements can have a contact surface with a surface area of at least 10,000 square meters per cubic meter of structured elements. The structured elements can also have a contact surface with a surface area of up to 800,000 square meters per cubic meter of structured elements. The structured elements can also have a contact surface with a surface area ranging from 10,000 to 800,000 square meters per cubic meter of structured elements.

In certain illustrative embodiments, the range of contact surface area of the structured elements of the presently disclosed subject matter is significantly larger than the contact surface area range of prior art materials. Moreover, specific grades of structured elements have a significantly broader range of ability to attract and retain undesired species. As examples, structured elements corresponding to 10 ppi conventional media are capable of attracting and retaining species of size ranging from 20 to 2000 microns and structured elements corresponding to 100 ppi are capable of attracting and retaining species of size ranging from 0.1 to 500 microns.

Figure 10:
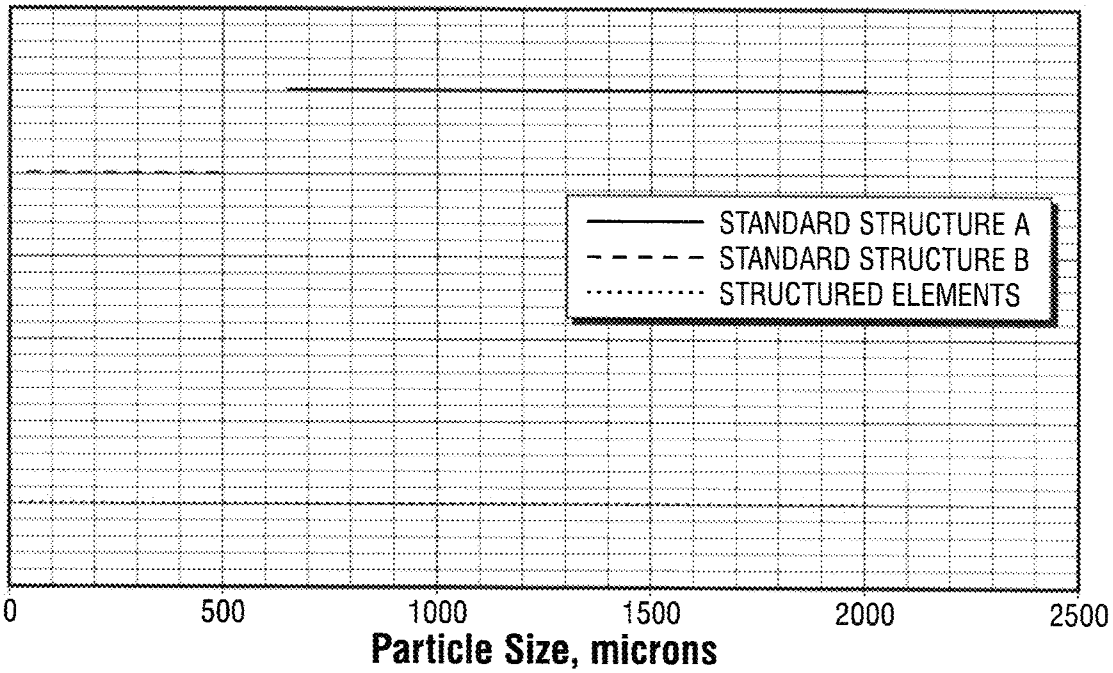
FIG. 10 is a graph comparing filtration capability for conventional materials and the presently disclosed materials in accordance with an illustrative embodiment of the presently disclosed subject matter.
Figure 11A:
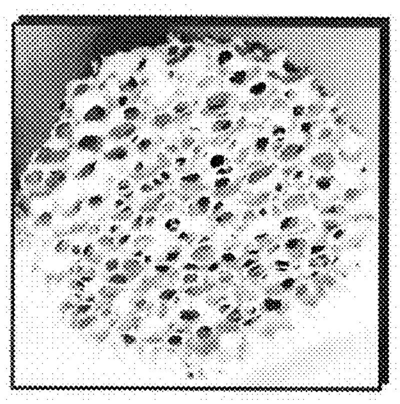
FIG. 11A Prior Art
FIGS. 11A-D are images of conventional porous filtration media having various sized openings.
Figure 11B:
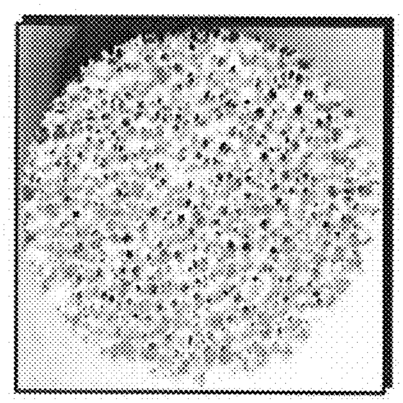
FIG. 11B Prior Art
Figure 11C:
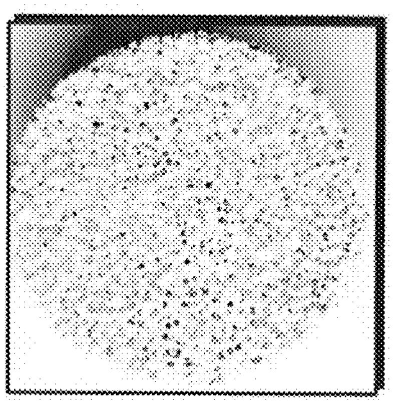
FIG. 11C Prior Art
Figure 11D:
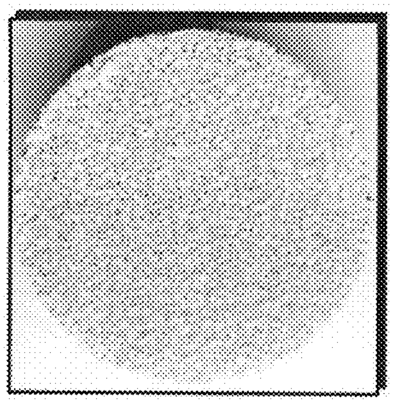

A graphical comparison of filtration capability for conventional materials and the presently disclosed materials is shown in FIG. 10. The graph shows the filtration ranges for both prior art materials (as described in, e.g., Paragraph 28 herein) and the presently disclosed materials with particle sizes shown in microns on the x axis. The Standard Structure A line corresponds to the filtration capability of conventional prior art 10 ppm media. This media is capable of filtering particulate matter from 650 to 2000 microns in size. The Standard Structure B line corresponds to the filtration capability of conventional prior art 100 ppm media. This media is capable of filtering particulate matter from 40 to 500 microns in size. These two represent the upper and lower ppi limits of conventional materials that can be commercially manufactured and used. As shown in FIG. 10, there is a gap between the upper end of the B line (500 microns) and the lower end of the A line (650 microns). If a specific process application needed to filter particulates across the entire 40 to 2000 micron range, both the A and B structures would be required plus another structure (of approximately 50 ppi) to bridge the 500 to 650 micron gap. This would mean three different grades of media in three different layers in the unit must be utilized.

By comparison, the Structured Elements line of FIG. 10 shows the capability of only one grade of the presently disclosed materials, in certain illustrative embodiments. This grade, when used alone, can filter particulates ranging in size from 20 to 2000 microns, and thus corresponds with the entire range of both the Standard Structure A line and the Standard Structure B line, and beyond. Thus, as explained previously herein, the Structured Elements can filter particulates that are both smaller and larger than feasible with prior art media. For example, the Structured Elements can filter particulates as small as 0.1 microns (100 nanometers) and as large as 11 millimeters, in certain illustrative embodiments.

Figure 13:
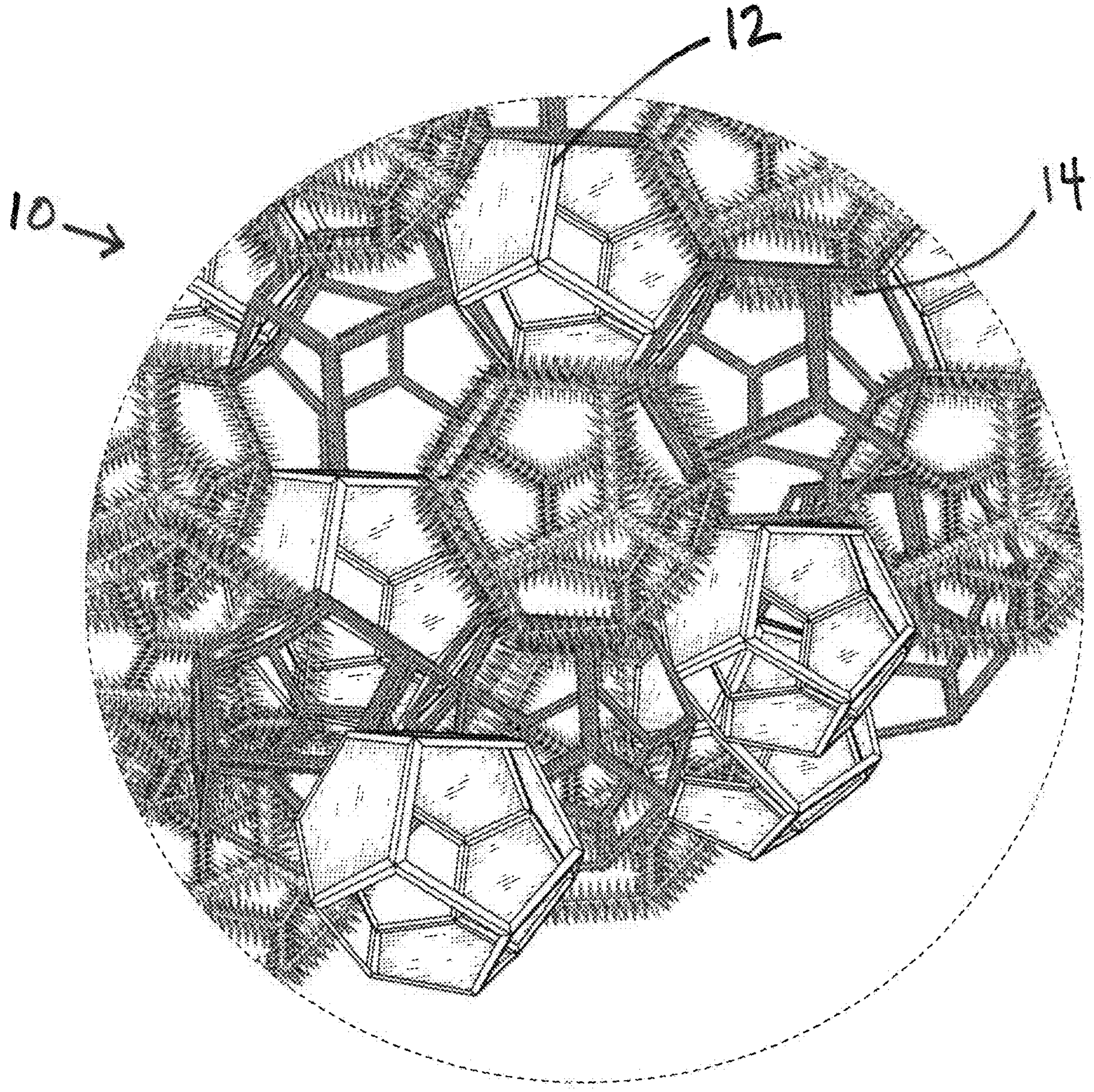
FIG. 13 is a zoomed-in perspective view of the structured element of FIG. 12A.

FIGS. 11A-11D and 12A-12D are comparative views of conventional materials and the presently disclosed structured elements according to certain illustrative embodiments. The conventional materials of FIGS. 11A-11D have sizes of approximately ten (10) (FIG. 11A), thirty (30) (FIG. 11B), fifty (50) (FIG. 11C) and eighty (80) (FIG. 11D) ppi, respectively. The structured elements of FIGS. 12A-12D are different and distinguishable in structure from those of FIGS. 11A-11D due to the presence of face blockage and surface roughness and asperities (as illustrated in FIG. 12E which is a zoomed portion of 12A) which advantageously provide a significant and measurable increase in contact surface area relative to conventional materials. According to certain illustrative embodiments, and as shown in FIG. 13, the unit cells that make up the structured elements can comprise a random mix of individual unit cells having, for example, various types of asperities and/or one or more blocked openings.

In certain illustrative embodiments, each of the structured elements in the images in FIGS. 12A-12D can contain a variety of blockages, surface roughness, and asperities. Geometrical models have been produced to estimate the relative increase of surface area that these different combinations are able to generate. For example, in certain illustrative embodiments, the structured element in FIG. 12A could have a surface area as low as 260 square meter per cubic meter and as high as 131,700 square meter per cubic meter. In certain illustrative embodiments, the structured element in FIG. 12B could have a surface area as low as 625 square meter per cubic meter and as high as 305,000 square meter per cubic meter. In certain illustrative embodiments, the structured element in FIG. 12C could have a surface area as low as 1223 square meter per cubic meter and as high as 556,500 square meter per cubic meter. In certain illustrative embodiments, the structured element in FIG. 12D could have a surface area as low as 1697 square meter per cubic meter and as high as 834,600 square meter per cubic meter. More in depth modeling has been performed to demonstrate surface areas exceeding 1,000,000 square meter per cubic meter provided sufficient structures and the preferred combination of blockages, roughness, and asperities. The structure in FIG. 12A could provide enough variability in surface area to perform the same function as FIGS. 11A-11D, vastly shrinking filtration system size and the number of layers required for proper function. Similar comparisons can be made about FIGS. 12B, C, and D, but it can also be said surface areas which could not be physically achieved in FIGS. 11A-11D are surpassed by more than 2 orders of magnitude in the structures represented in FIGS. 12A-12D, in certain illustrative embodiments.

Various methods of utilizing the structured elements in or in connection with a unit are disclosed herein. For example, in certain illustrative embodiments, a method of mitigating undesired species within and providing effective flow division and distribution of one or more fluid streams is provided. The mitigation can involve retention, capture, trapping, isolation, neutralization, removal, agglomeration, coalescence, transformation or otherwise rendering said undesired species impotent. The undesired species can include small particulates, entrained matter, undesired chemicals, extraneous contaminants, and the like. A treating zone of the structured elements can be provided whereby the structured elements: (i) have sufficient voidage, surface area and passageway tortuosity; (ii) have a plurality of surfaces within said elements sufficient to facilitate both mitigation of the undesired species and effective flow division and distribution; and (iii) have a plurality of tortuous flow passageways to facilitate both mitigation of undesired species on the surfaces of the structured elements and unimpeded passage of the streams thru the treating zone. The effluent from the treating zone can be fed to a processing zone located downstream in the same unit. Asperities and irregularities such as spikes and fibrils can be created on the surfaces of the structured elements. The faces of the structured elements can also be blocked or partially blocked. In another aspect, a method of removing contaminants from a contaminated feed stream is provided. The contaminated feed stream can be passed through a layer of structured elements, the layer of structured elements being in an amount sufficient to substantially filter the contaminant from the feed stream. The contaminated feed stream can be contacted with the surfaces of the structured elements to remove the contaminants from the contaminated feed stream.

In certain illustrative embodiments, the stream that is treated with the structured elements is an industrial process stream and the unit is an industrial process unit. For example, and without limitation, the industrial process stream can be a hydrocarbon or an inorganic stream, and the industrial process unit can be a hydrotreater, a still or an extractor.

It is to be understood that the presently disclosed subject matter is not to be limited to the exact details of construction, operation, exact materials, or embodiments shown and described, as obvious modifications and equivalents will be apparent to one skilled in the art. Accordingly, the presently disclosed subject matter is therefore to be limited only by the scope of the appended claims.

What is claimed is:

1. A method of treating and processing a fluid stream in a process unit, the method comprising:

passing the fluid stream through a treating zone in the process unit containing plurality of structured elements, wherein each structured element comprises one or more interconnected unit cells, each unit cell having a frame with a three dimensional polyhedron structure and a plurality of faces, and wherein the faces include a combination of open, partially open and closed faces, and wherein the frame, the partially open faces, and the closed faces each have a plurality of differently-shaped asperities disposed on the surfaces thereof;

contacting the fluid stream with the structured elements in the treating zone;

treating the fluid stream, wherein the treating comprises dividing and distributing the flow of the fluid stream;

passing the fluid stream exiting the treating zone through a processing zone in the process unit containing catalyst material; and processing the fluid stream with the catalyst material.

2. The method of claim 1, wherein the fluid stream is an industrial process stream and the process unit is an industrial process unit.

3. The method of claim 1, wherein the asperities comprise one or more of fibrils and filaments.

* * * * *